(12) United States Patent
Qiu et al.

(10) Patent No.: US 12,209,884 B2
(45) Date of Patent: Jan. 28, 2025

(54) USING UNWOUND TETHER LENGTH TO MEASURE ALTITUDE

(71) Applicant: Wing Aviation LLC, Mountain View, CA (US)

(72) Inventors: Ivan Qiu, Redwood City, CA (US); Louis Kenneth Dressel, San Francisco, CA (US)

(73) Assignee: Wing Aviation LLC, Palo Alto, CA (US)

( * ) Notice: Subject to any disclaimer, the term of this patent is extended or adjusted under 35 U.S.C. 154(b) by 222 days.

(21) Appl. No.: 17/812,854

(22) Filed: Jul. 15, 2022

(65) Prior Publication Data

US 2024/0019246 A1 Jan. 18, 2024

(51) Int. Cl.
*G01C 5/00* (2006.01)
*B64C 39/02* (2023.01)
(Continued)

(52) U.S. Cl.
CPC ............ *G01C 5/005* (2013.01); *B64C 39/022* (2013.01); *B64C 39/024* (2013.01); *B64D 1/08* (2013.01);
(Continued)

(58) Field of Classification Search
CPC ..... G01C 5/005; B64C 39/022; B64C 39/024; B64D 1/08; B64D 1/22; G05D 1/101;
(Continued)

(56) References Cited

U.S. PATENT DOCUMENTS 9,783,295 B2 10/2017 Takayama et al.
9,972,212 B1 * 5/2018 Sperindeo ............... G06F 18/22
(Continued)

FOREIGN PATENT DOCUMENTS

CN   109445449 A  *  3/2019  ........... G05D 1/0808
JP   2018069969     5/2018
JP   2018069969 A  *  5/2018

OTHER PUBLICATIONS

Xiao et al., "Indoor UAV Localization Using a Tether," ResearchGate, Conference Paper, Aug. 2018, 7 pages.
(Continued)

*Primary Examiner* — Khoi H Tran
*Assistant Examiner* — Nhi Q Bui
(74) *Attorney, Agent, or Firm* — McDonnell Boehnen Hulbert & Berghoff LLP

(57) ABSTRACT

A method includes obtaining sensor data indicating a tension experienced by a tether while a payload coupling apparatus connected to the tether is lowered from an aerial vehicle using the tether. The method also includes determining, based on the sensor data, a ground contact time at which the payload coupling apparatus or a payload coupled thereto made initial contact with a ground surface. The method additionally includes determining a length of the tether released from the aerial vehicle at the ground contact time. The method further includes determining a tether-based altitude of the aerial vehicle based on the length of the tether released from the aerial vehicle at the ground contact time. The method yet further includes causing the aerial vehicle to perform an operation based on the tether-based altitude.

20 Claims, 14 Drawing Sheets

(51) Int. Cl.
  *B64D 1/08* (2006.01)
  *G05D 1/00* (2006.01)
  *B64U 101/60* (2023.01)

(52) U.S. Cl.
  CPC ......... *G05D 1/101* (2013.01); *B64U 2101/60* (2023.01)

(58) Field of Classification Search
  CPC .......... G05D 1/48; G05D 1/606; G05D 1/667; G05D 2105/285; G05D 2109/254; B64U 2101/60; B64U 2201/202
  See application file for complete search history.

(56) References Cited

U.S. PATENT DOCUMENTS

| | | |
|---|---|---|
| 10,710,746 B2 | 7/2020 | Lombardini et al. |
| 10,858,103 B1 | 12/2020 | Buchmueller et al. |
| 2015/0090175 A1* | 4/2015 | Mori ................. B63G 8/001 114/331 |
| 2016/0059963 A1* | 3/2016 | Burgess ................. B64D 1/12 701/49 |
| 2016/0195443 A1* | 7/2016 | Jensen ................. G01M 9/06 73/862.041 |
| 2016/0293019 A1 | 10/2016 | Kim et al. |
| 2019/0100314 A1* | 4/2019 | Prager ................. B66D 1/485 |
| 2022/0100207 A1 | 3/2022 | Koyanagi |
| 2022/0136863 A1 | 5/2022 | Berggrund |

OTHER PUBLICATIONS

International Searching Authority, International Search Report mailed on Oct. 24, 2023, issued in connection with International Patent Application No. PCT/US2023/027426 filed Jul. 11, 2023, 10 pages.

* cited by examiner

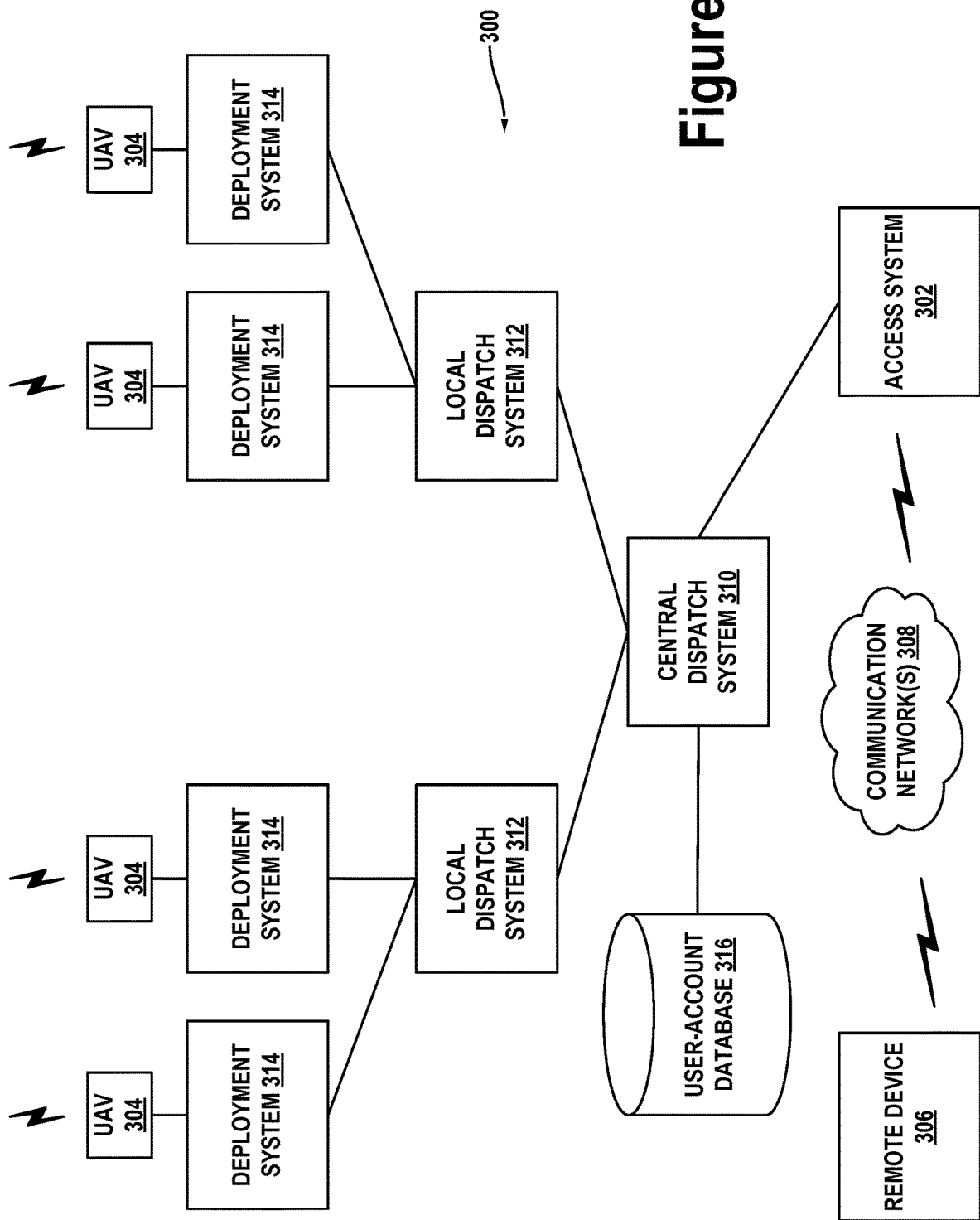

USING UNWOUND TETHER LENGTH TO MEASURE ALTITUDE

BACKGROUND

An unmanned vehicle is a vehicle capable of travel without a physically-present human operator. An unmanned vehicle may operate in a remote-control mode, in an autonomous mode, or in a partially autonomous mode. Accordingly, the unmanned vehicle may be referred to as an autonomous vehicle.

When an unmanned vehicle operates in a remote-control mode, a pilot or driver that is at a remote location can control the unmanned vehicle via commands that are sent to the unmanned vehicle via a wireless link. When the unmanned vehicle operates in autonomous mode, the unmanned vehicle typically moves based on pre-programmed navigation waypoints, dynamic automation systems, or a combination of these. Further, some unmanned vehicles can operate in both a remote-control mode and an autonomous mode, and in some instances may do so simultaneously. For instance, a remote pilot or driver may wish to leave navigation to an autonomous system while manually performing another task, such as operating a mechanical system for picking up objects, as an example.

Various types of unmanned vehicles exist for various different environments. For instance, unmanned vehicles exist for operation in the air, on the ground, underwater, and in space. Examples include quad-copters and tail-sitter UAVs, among others. Unmanned vehicles also exist for hybrid operations in which multi-environment operation is possible. Examples of hybrid unmanned vehicles include an amphibious craft that is capable of operation on land as well as on water or a floatplane that is capable of landing on water as well as on land. Other examples are also possible.

SUMMARY

An aerial vehicle may include a tether configured to allow a tethered component, such as a payload coupling apparatus and/or a payload, to be retracted towards and/or lowered from the aerial vehicle. A tether-based altitude of the aerial vehicle may be determined based on a length of tether deployed from the aerial vehicle when the tether is taut (i.e., is not slacked) and spans a distance between the aerial vehicle and a ground surface. For example, the tether-based altitude may be based on a length of tether deployed from the aerial vehicle at a ground contact time when the tethered component makes initial contact with the ground surface, and/or a length of tether deployed from the aerial vehicle at a ground lift-off time when the tethered component is initially lifted off of the ground surface. The aerial vehicle may be configured to perform operations based on the tether-based altitude.

In a first example embodiment, a method may include obtaining sensor data indicating a tension experienced by a tether while a payload coupling apparatus connected to the tether is lowered from an aerial vehicle using the tether. The method may also include determining, based on the sensor data, a ground contact time at which the payload coupling apparatus or a payload coupled thereto made initial contact with a ground surface. The method may additionally include determining a length of the tether released from the aerial vehicle at the ground contact time. The method may further include determining a tether-based altitude of the aerial vehicle based on the length of the tether released from the aerial vehicle at the ground contact time. The method may yet further include causing the aerial vehicle to perform an operation based on the tether-based altitude.

In a second example embodiment, a system may include a processor and a non-transitory computer-readable medium having stored thereon instructions that, when executed by the processor, cause the processor to perform operations in accordance with the first example embodiment.

In a third example embodiment, a non-transitory computer-readable medium may have stored thereon instructions that, when executed by a computing device, cause the computing device to perform operations in accordance with the first example embodiment.

In a fourth example embodiment, a system may include various means for carrying out each of the operations of the first example embodiment.

These, as well as other embodiments, aspects, advantages, and alternatives, will become apparent to those of ordinary skill in the art by reading the following detailed description, with reference where appropriate to the accompanying drawings. Further, this summary and other descriptions and figures provided herein are intended to illustrate embodiments by way of example only and, as such, that numerous variations are possible. For instance, structural elements and process steps can be rearranged, combined, distributed, eliminated, or otherwise changed, while remaining within the scope of the embodiments as claimed.

BRIEF DESCRIPTION OF THE DRAWINGS

FIG. 3 is a block diagram illustrating a distributed UAV system, in accordance with examples described herein.

DETAILED DESCRIPTION

Figure 1A:
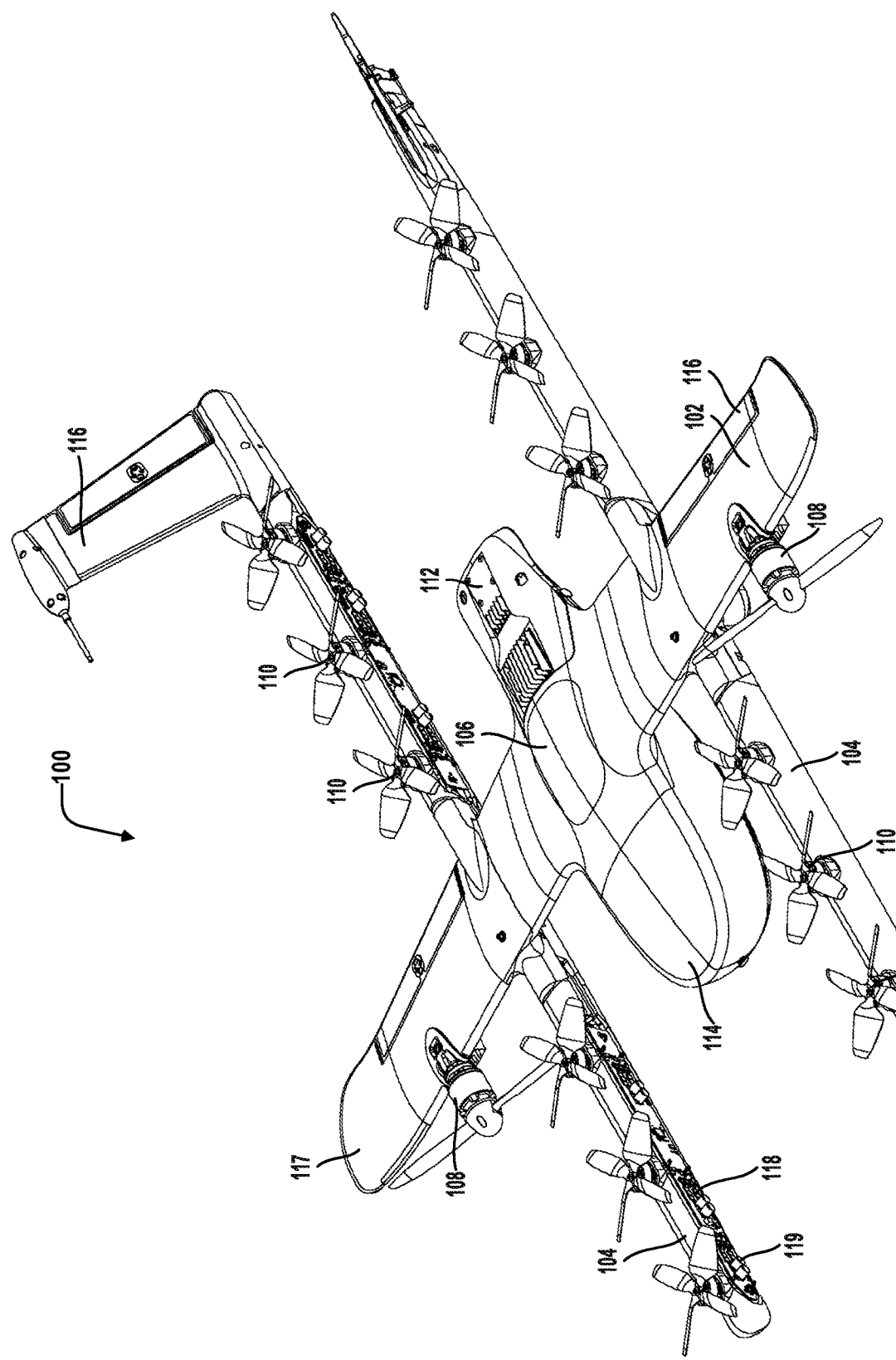
FIG. 1A illustrates an unmanned aerial vehicle, in accordance with examples described herein.

Example methods, devices, and systems are described herein. It should be understood that the words "example" and "exemplary" are used herein to mean "serving as an example, instance, or illustration." Any embodiment or feature described herein as being an "example," "exemplary," and/or "illustrative" is not necessarily to be construed as preferred or advantageous over other embodiments or features unless stated as such. Thus, other embodiments can be utilized and other changes can be made without departing from the scope of the subject matter presented herein.

Accordingly, the example embodiments described herein are not meant to be limiting. It will be readily understood that the aspects of the present disclosure, as generally described herein, and illustrated in the figures, can be arranged, substituted, combined, separated, and designed in a wide variety of different configurations.

Further, unless context suggests otherwise, the features illustrated in each of the figures may be used in combination with one another. Thus, the figures should be generally viewed as component aspects of one or more overall embodiments, with the understanding that not all illustrated features are necessary for each embodiment.

Additionally, any enumeration of elements, blocks, or steps in this specification or the claims is for purposes of clarity. Thus, such enumeration should not be interpreted to require or imply that these elements, blocks, or steps adhere to a particular arrangement or are carried out in a particular order. Unless otherwise noted, figures are not drawn to scale.

I. Overview

An aerial vehicle may be configured to use a tether to determine a tether-based altitude of the aerial vehicle. The tether may connect a tethered component, such as a payload coupling apparatus and/or a payload, to the aerial vehicle. The aerial vehicle may be configured to extend the tether to lower the tethered component to a ground surface in an environment, and retract the tether to lift the tethered component towards the aerial vehicle. For example, the payload coupling apparatus may be used to couple a payload to the tether, and the tether may thus be used to pick up and/or drop-off the payload.

The aerial vehicle may include one or more sensors configured to measure a tension exerted on the tether by, for example, a weight of the tether and the tethered component. Sensor data indicative of tension experienced by the tether may be used to identify a ground contact time and/or a ground lift-off time of the tethered component. The ground contact time may represent a time at which the tethered component made initial contact with the ground surface while being lowered towards the ground surface. The ground lift-off time may represent a time at which the tethered component was lifted off of the ground surface while being lifted towards the aerial vehicle. In other implementations, the ground contact time and/or the ground lift-off time may be determined based on, for example, image data and/or other sensors provided on the aerial vehicle and/or the tethered component.

The aerial vehicle may also include one or more sensors configured to measure a length of the tether that has been deployed/released from the aerial vehicle. The tether-based altitude of the aerial vehicle may be determined based on the length of the tether deployed/released from the aerial vehicle at the ground contact time and/or the ground lift-off time. Thus, the tether-based altitude of the aerial vehicle may be determined as part of a payload pick-up operation, a payload drop-off operation, and/or a tether-based altitude measurement operation that is independent of payload pick-up or drop-off. In some cases, the tethered component may be deployed and/or retracted multiple times to obtain multiple tether-based altitude measurements, which may be combined to determine a final tether-based altitude measurement.

Specifically, in the absence of wind, the tether and the tethered component may form an approximately vertical line between the aerial vehicle and the ground surface. Thus, the tether-based altitude of the aerial vehicle may be based on a sum of the deployed tether length and a vertical dimension of the tethered component. When wind is present in an environment of the aerial vehicle, the tethered component may be displaced horizontally and/or vertically relative to where the tethered component would be in the absence of wind. Accordingly, the tether may be modeled as a hypotenuse of a right triangle or as a section of a parabola. Accordingly, the tether-based altitude may be determined by determining a vertical component of the right triangle or the parabola.

The tether-based altitude may be combined with one or more other sensor-based altitude measurements to generate a fused altitude of the aerial vehicle. For example, the tether-based altitude and the one or more sensor-based altitudes may be provided as inputs to a Kalman filter, a machine learning model, and/or other model configured to generate the fused altitude. Additionally or alternatively, the tether-based altitude may be used to validate an accuracy of one or more other altitude sensors. For example, when a difference between the tether-based altitude and a particular sensor-based altitude exceeds a threshold difference, the sensor that generated the particular sensor-based altitude may be flagged for calibration, validation, inspection, and/or replacement, among other possibilities.

II. Example Unmanned Vehicles

Herein, the terms "unmanned aerial system" and "UAV" refer to any autonomous or semi-autonomous vehicle that is capable of performing some functions without a physically present human pilot. A UAV can take various forms. For example, a UAV may take the form of a fixed-wing aircraft, a glider aircraft, a tail-sitter aircraft, a jet aircraft, a ducted fan aircraft, a lighter-than-air dirigible such as a blimp or steerable balloon, a rotorcraft such as a helicopter or multicopter, and/or an ornithopter, among other possibilities. Further, the terms "drone," "unmanned aerial vehicle system" (UAVS), or "unmanned aerial vehicle" may also be used to refer to a UAV.

FIG. 1A is an isometric view of an example UAV 100. UAV 100 includes wing 102, booms 104, and a fuselage 106. Wings 102 may be stationary and may generate lift based on the wing shape and the UAV's forward airspeed. For instance, the two wings 102 may have an airfoil-shaped cross section to produce an aerodynamic force on UAV 100. In some embodiments, wing 102 may carry horizontal propulsion units 108, and booms 104 may carry vertical propulsion units 110. In operation, power for the propulsion units may be provided from a battery compartment 112 of fuselage 106. In some embodiments, fuselage 106 also includes an avionics compartment 114, an additional battery compartment (not shown) and/or a delivery unit (not shown, e.g., a winch system) for handling the payload. In some embodiments, fuselage 106 is modular, and two or more compartments (e.g., battery compartment 112, avionics compartment 114, other payload and delivery compartments) are detachable from each other and securable to each other (e.g., mechanically, magnetically, or otherwise) to contiguously form at least a portion of fuselage 106.

In some embodiments, booms 104 terminate in rudders 116 for improved yaw control of UAV 100. Further, wings 102 may terminate in wing tips 117 for improved control of lift of the UAV.

In the illustrated configuration, UAV 100 includes a structural frame. The structural frame may be referred to as a "structural H-frame" or an "H-frame" (not shown) of the UAV. The H-frame may include, within wings 102, a wing spar (not shown) and, within booms 104, boom carriers (not shown). In some embodiments the wing spar and the boom carriers may be made of carbon fiber, hard plastic, aluminum, light metal alloys, or other materials. The wing spar and the boom carriers may be connected with clamps. The wing spar may include pre-drilled holes for horizontal propulsion units 108, and the boom carriers may include pre-drilled holes for vertical propulsion units 110.

In some embodiments, fuselage 106 may be removably attached to the H-frame (e.g., attached to the wing spar by clamps, configured with grooves, protrusions or other features to mate with corresponding H-frame features, etc.). In other embodiments, fuselage 106 similarly may be removably attached to wings 102. The removable attachment of fuselage 106 may improve quality and or modularity of UAV 100. For example, electrical/mechanical components and/or subsystems of fuselage 106 may be tested separately from, and before being attached to, the H-frame. Similarly, printed circuit boards (PCBs) 118 may be tested separately from, and before being attached to, the boom carriers, therefore eliminating defective parts/subassemblies prior to completing the UAV. For example, components of fuselage 106 (e.g., avionics, battery unit, delivery units, an additional battery compartment, etc.) may be electrically tested before fuselage 106 is mounted to the H-frame. Furthermore, the motors and the electronics of PCBs 118 may also be electrically tested before the final assembly. Generally, the identification of the defective parts and subassemblies early in the assembly process lowers the overall cost and lead time of the UAV. Furthermore, different types/models of fuselage 106 may be attached to the H-frame, therefore improving the modularity of the design. Such modularity allows these various parts of UAV 100 to be upgraded without a substantial overhaul to the manufacturing process.

In some embodiments, a wing shell and boom shells may be attached to the H-frame by adhesive elements (e.g., adhesive tape, double-sided adhesive tape, glue, etc.). Therefore, multiple shells may be attached to the H-frame instead of having a monolithic body sprayed onto the H-frame. In some embodiments, the presence of the multiple shells reduces the stresses induced by the coefficient of thermal expansion of the structural frame of the UAV. As a result, the UAV may have better dimensional accuracy and/or improved reliability.

Moreover, in at least some embodiments, the same H-frame may be used with the wing shell and/or boom shells having different size and/or design, therefore improving the modularity and versatility of the UAV designs. The wing shell and/or the boom shells may be made of relatively light polymers (e.g., closed cell foam) covered by the harder, but relatively thin, plastic skins.

The power and/or control signals from fuselage 106 may be routed to PCBs 118 through cables running through fuselage 106, wings 102, and booms 104. In the illustrated embodiment, UAV 100 has four PCBs, but other numbers of PCBs are also possible. For example, UAV 100 may include two PCBs, one per the boom. The PCBs carry electronic components 119 including, for example, power converters, controllers, memory, passive components, etc. In operation, propulsion units 108 and 110 of UAV 100 are electrically connected to the PCBs.

Many variations on the illustrated UAV are possible. For instance, fixed-wing UAVs may include more or fewer rotor units (vertical or horizontal), and/or may utilize a ducted fan or multiple ducted fans for propulsion. Further, UAVs with more wings (e.g., an "x-wing" configuration with four wings), are also possible. Although FIG. 1 illustrates two wings 102, two booms 104, two horizontal propulsion units 108, and six vertical propulsion units 110 per boom 104, it should be appreciated that other variants of UAV 100 may be implemented with more or less of these components. For example, UAV 100 may include four wings 102, four booms 104, and more or less propulsion units (horizontal or vertical).

Figure 1B:
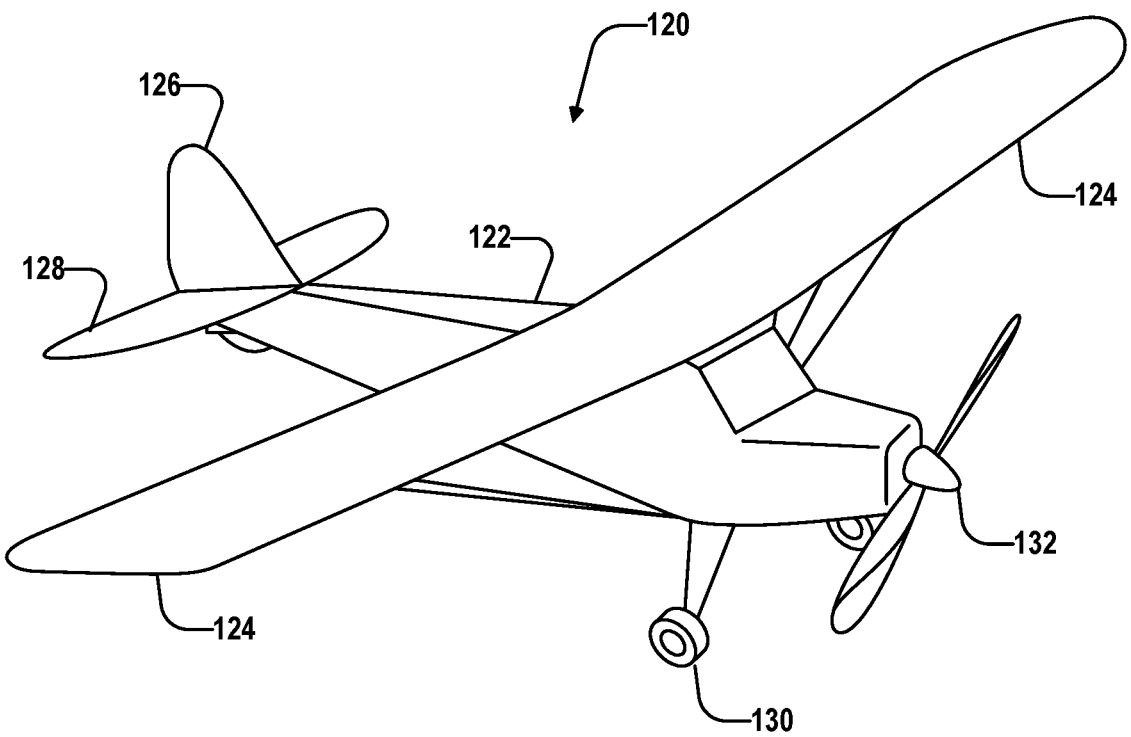
FIG. 1B illustrates an unmanned aerial vehicle, in accordance with examples described herein.

Similarly, FIG. 1B shows another example of a fixed-wing UAV 120. Fixed-wing UAV 120 includes fuselage 122, two wings 124 with an airfoil-shaped cross section to provide lift for UAV 120, vertical stabilizer 126 (or fin) to stabilize the plane's yaw (turn left or right), horizontal stabilizer 128 (also referred to as an elevator or tailplane) to stabilize pitch (tilt up or down), landing gear 130, and propulsion unit 132, which can include a motor, shaft, and propeller.

Figure 1C:
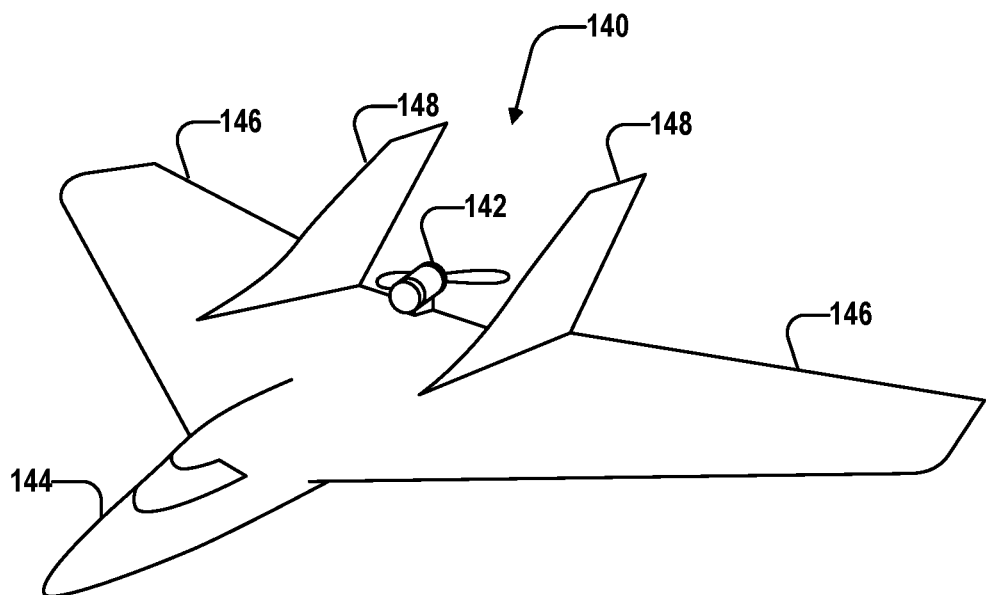
FIG. 1C illustrates an unmanned aerial vehicle, in accordance with examples described herein.

FIG. 1C shows an example of UAV 140 with a propeller in a pusher configuration. The term "pusher" refers to the fact that propulsion unit 142 is mounted at the back of UAV 140 and "pushes" the vehicle forward, in contrast to the propulsion unit 142 being mounted at the front of UAV 140. Similar to the description provided for FIGS. 1A and 1B, FIG. 1C depicts common structures used in a pusher plane, including fuselage 144, two wings 146, vertical stabilizers 148, and propulsion unit 142, which can include a motor, shaft, and propeller.

Figure 1D:
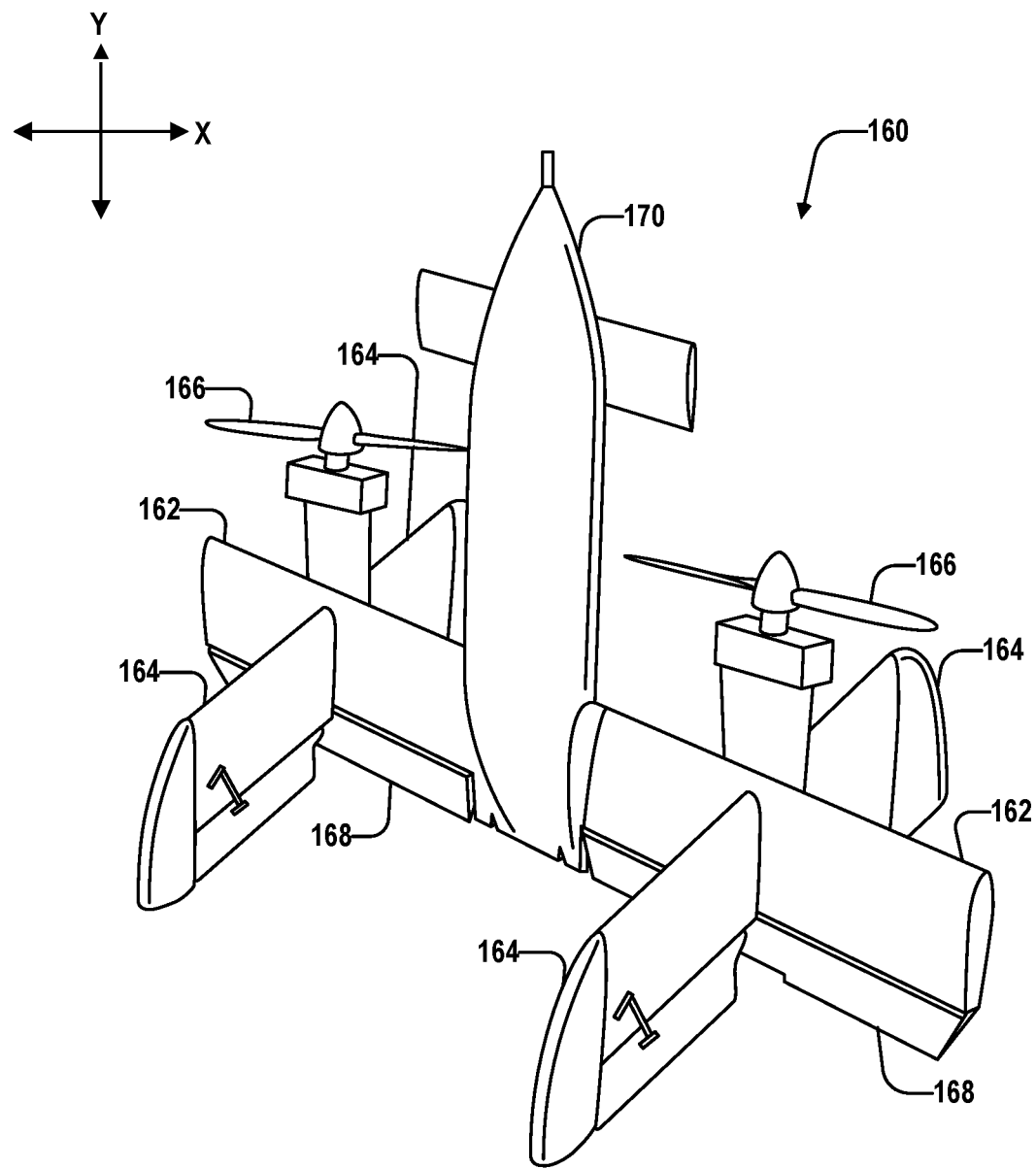
FIG. 1D illustrates an unmanned aerial vehicle, in accordance with examples described herein.

FIG. 1D shows an example tail-sitter UAV 160. In the illustrated example, tail-sitter UAV 160 has fixed wings 162 to provide lift and allow UAV 160 to glide horizontally (e.g., along the x-axis, in a position that is approximately perpendicular to the position shown in FIG. 1D). However, fixed wings 162 also allow tail-sitter UAV 160 to take off and land vertically on its own.

For example, at a launch site, tail-sitter UAV 160 may be positioned vertically (as shown) with fins 164 and/or wings 162 resting on the ground and stabilizing UAV 160 in the vertical position. Tail-sitter UAV 160 may then take off by operating propellers 166 to generate an upward thrust (e.g., a thrust that is generally along the y-axis). Once at a suitable altitude, tail-sitter UAV 160 may use flaps 168 to reorient itself in a horizontal position, such that fuselage 170 is closer to being aligned with the x-axis than the y-axis. Positioned horizontally, propellers 166 may provide forward thrust so that tail-sitter UAV 160 can fly in a similar manner as a typical airplane.

Many variations on the illustrated fixed-wing UAVs are possible. For instance, fixed-wing UAVs may include more or fewer propellers, and/or may utilize a ducted fan or multiple ducted fans for propulsion. Further, UAVs with more wings (e.g., an "x-wing" configuration with four wings), with fewer wings, or even with no wings, are also possible.

Figure 1E:
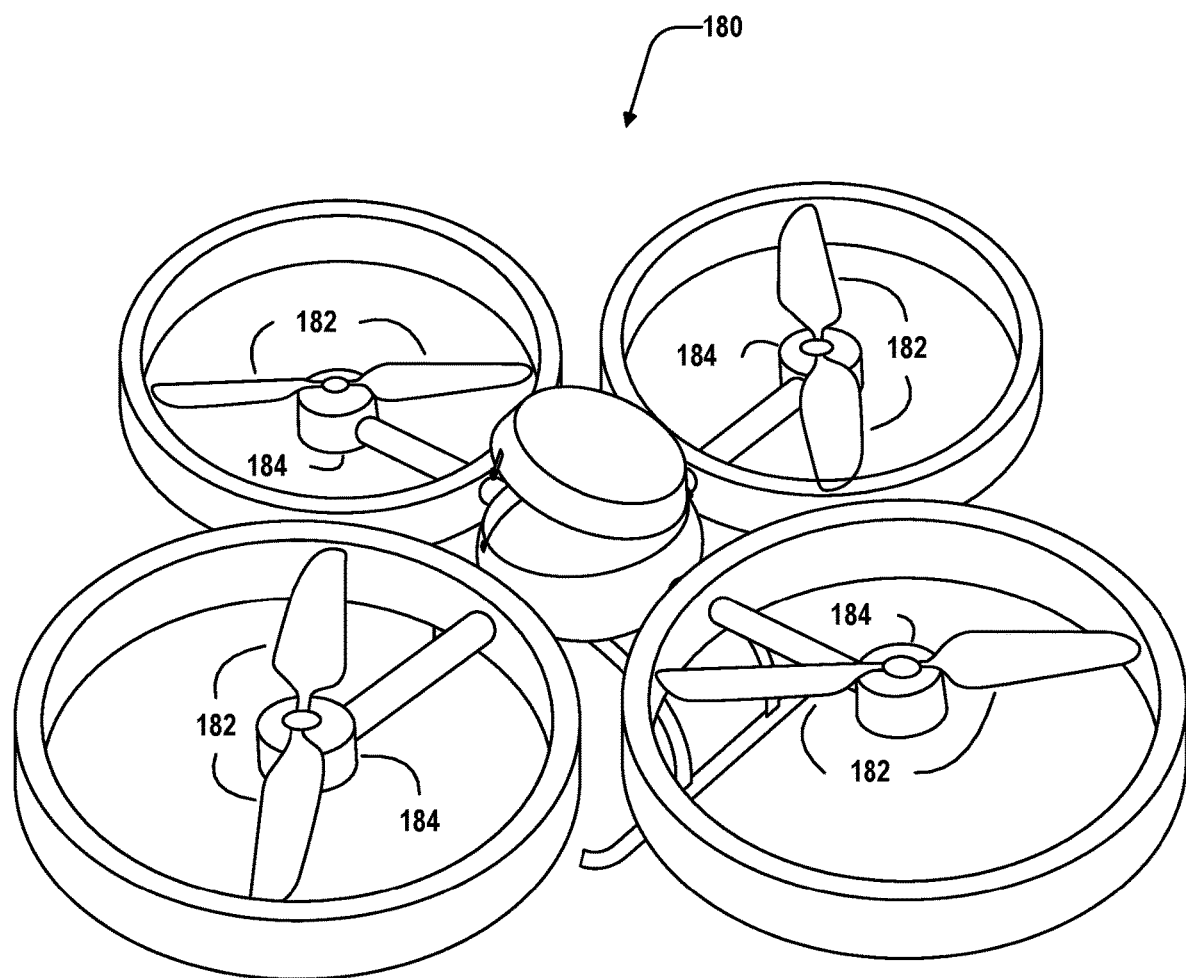
FIG. 1E illustrates an unmanned aerial vehicle, in accordance with examples described herein.

As noted above, some embodiments may involve other types of UAVs, in addition to or in the alternative to fixed-wing UAVs. For instance, FIG. 1E shows an example of rotorcraft 180 that is commonly referred to as a multicopter. Multicopter 180 may also be referred to as a quad-copter, as it includes four rotors 182. It should be understood that example embodiments may involve a rotorcraft with more or fewer rotors than multicopter 180. For example, a helicopter typically has two rotors. Other examples with three or more rotors are possible as well. Herein, the term "multicopter" refers to any rotorcraft having more than two rotors, and the term "helicopter" refers to rotorcraft having two rotors.

Referring to multicopter 180 in greater detail, four rotors 182 provide propulsion and maneuverability for multicopter 180. More specifically, each rotor 182 includes blades that are attached to motor 184. Configured as such, rotors 182 may allow multicopter 180 to take off and land vertically, to maneuver in any direction, and/or to hover. Further, the pitch of the blades may be adjusted as a group and/or differentially, and may allow multicopter 180 to control its pitch, roll, yaw, and/or altitude.

It should be understood that references herein to an "unmanned" aerial vehicle or UAV can apply equally to autonomous and semi-autonomous aerial vehicles. In an autonomous implementation, all functionality of the aerial vehicle is automated; e.g., pre-programmed or controlled via real-time computer functionality that responds to input from various sensors and/or pre-determined information. In a semi-autonomous implementation, some functions of an aerial vehicle may be controlled by a human operator, while other functions are carried out autonomously. Further, in some embodiments, a UAV may be configured to allow a remote operator to take over functions that can otherwise be controlled autonomously by the UAV. Yet further, a given type of function may be controlled remotely at one level of abstraction and performed autonomously at another level of abstraction. For example, a remote operator could control high level navigation decisions for a UAV, such as by specifying that the UAV should travel from one location to another (e.g., from a warehouse in a suburban area to a delivery address in a nearby city), while the UAV's navigation system autonomously controls more fine-grained navigation decisions, such as the specific route to take between the two locations, specific flight controls to achieve the route and avoid obstacles while navigating the route, and so on.

More generally, it should be understood that the example UAVs described herein are not intended to be limiting. Example embodiments may relate to, be implemented within, or take the form of any type of unmanned aerial vehicle.

III. Example UAV Components

Figure 2:
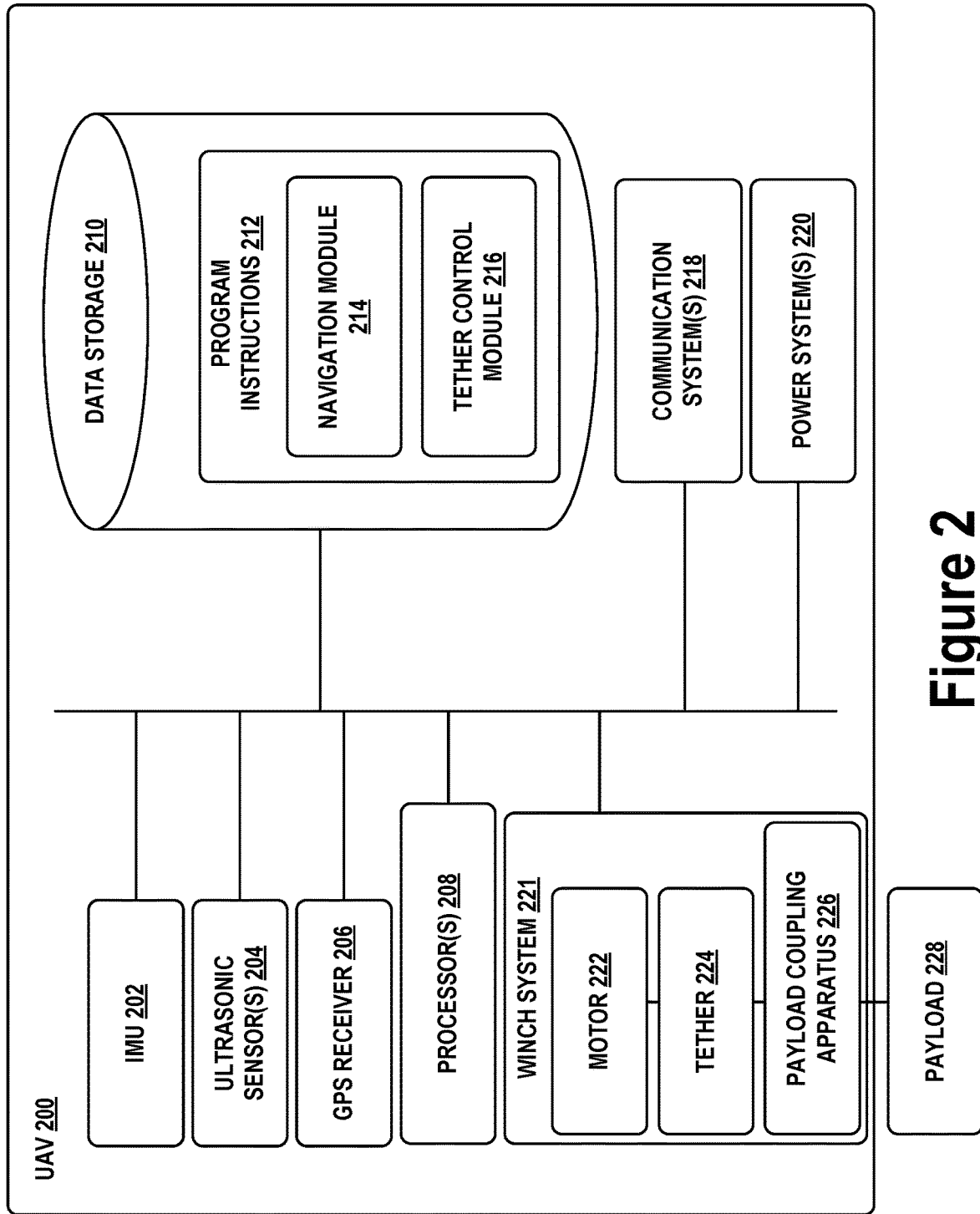
FIG. 2 illustrates components of an unmanned aerial system, in accordance with examples described herein.

FIG. 2 is a simplified block diagram illustrating components of UAV 200, according to an example embodiment. UAV 200 may take the form of, or be similar in form to, one of UAVs 100, 120, 140, 160, and 180 described in reference to FIGS. 1A-1E. However, UAV 200 may also take other forms.

UAV 200 may include various types of sensors, and may include a computing system configured to provide the functionality described herein. In the illustrated embodiment, the sensors of UAV 200 include inertial measurement unit (IMU) 202, ultrasonic sensor(s) 204, and GPS receiver 206, among other possible sensors and sensing systems.

In the illustrated embodiment, UAV 200 also includes processor(s) 208. Processor 208 may be a general-purpose processor or a special purpose processor (e.g., digital signal processors, application specific integrated circuits, etc.). Processor(s) 208 can be configured to execute computer-readable program instructions 212 that are stored in data storage 210 and are executable to provide the functionality of a UAV described herein.

Data storage 210 may include or take the form of one or more computer-readable storage media that can be read or accessed by at least one processor 208. The one or more computer-readable storage media can include volatile and/or non-volatile storage components, such as optical, magnetic, organic or other memory or disc storage, which can be integrated in whole or in part with at least one of processor(s) 208. In some embodiments, data storage 210 can be implemented using a single physical device (e.g., one optical, magnetic, organic or other memory or disc storage unit), while in other embodiments, data storage 210 can be implemented using two or more physical devices.

As noted, data storage 210 can include computer-readable program instructions 212 and perhaps additional data, such as diagnostic data of UAV 200. As such, data storage 210 may include program instructions 212 to perform or facilitate some or all of the UAV functionality described herein. For instance, in the illustrated embodiment, program instructions 212 include navigation module 214 and tether control module 216.

In an illustrative embodiment, IMU 202 may include both an accelerometer and a gyroscope, which may be used together to determine an orientation of UAV 200. In particular, the accelerometer can measure the orientation of the vehicle with respect to earth, while the gyroscope measures the rate of rotation around an axis. IMUs are commercially available in low-cost, low-power packages. For instance, IMU 202 may take the form of or include a miniaturized MicroElectroMechanical System (MEMS) or a NanoElectroMechanical System (NEMS). Other types of IMUs may also be utilized.

IMU 202 may include other sensors, in addition to accelerometers and gyroscopes, which may help to better determine position and/or help to increase autonomy of UAV 200. Two examples of such sensors are magnetometers and pressure sensors. In some embodiments, a UAV may include a low-power, digital 3-axis magnetometer, which can be used to realize an orientation independent electronic compass for accurate heading information. However, other types of magnetometers may be utilized as well. Other examples are also possible. Further, note that a UAV could include some or all of the above-described inertia sensors as separate components from an IMU.

UAV 200 may also include a pressure sensor or barometer, which can be used to determine the altitude of UAV 200. Alternatively, other sensors, such as sonic altimeters or radar altimeters, can be used to provide an indication of altitude, which may help to improve the accuracy of and/or prevent drift of an IMU.

In a further aspect, UAV 200 may include one or more sensors that allow the UAV to sense objects in the environment. For instance, in the illustrated embodiment, UAV 200 includes ultrasonic sensor(s) 204. Ultrasonic sensor(s) 204 can determine the distance to an object by generating sound waves and determining the time interval between transmission of the wave and receiving the corresponding echo off an object. A typical application of an ultrasonic sensor for unmanned vehicles or IMUs is low-level altitude control and obstacle avoidance. An ultrasonic sensor can also be used for vehicles that need to hover at a certain height or need to be capable of detecting obstacles. Other systems can be used to determine, sense the presence of, and/or determine the distance to nearby objects, such as a light detection and ranging (LIDAR) system, laser detection and ranging (LADAR) system, and/or an infrared or forward-looking infrared (FLIR) system, among other possibilities.

In some embodiments, UAV 200 may also include one or more imaging system(s). For example, one or more still and/or video cameras may be utilized by UAV 200 to capture image data from the UAV's environment. As a specific example, charge-coupled device (CCD) cameras or complementary metal-oxide-semiconductor (CMOS) cameras can be used with unmanned vehicles. Such imaging sensor(s) have numerous possible applications, such as obstacle avoidance, localization techniques, ground tracking for more accurate navigation (e.g., by applying optical flow techniques to images), video feedback, and/or image recognition and processing, among other possibilities.

UAV 200 may also include GPS receiver 206. GPS receiver 206 may be configured to provide data that is typical of well-known GPS systems, such as the GPS coordinates of UAV 200. Such GPS data may be utilized by UAV 200 for various functions. As such, the UAV may use GPS receiver 206 to help navigate to the caller's location, as indicated, at least in part, by the GPS coordinates provided by their mobile device. Other examples are also possible.

Navigation module 214 may provide functionality that allows UAV 200 to, for example, move about its environment and reach a desired location. To do so, navigation module 214 may control the altitude and/or direction of flight by controlling the mechanical features of the UAV that affect flight (e.g., its rudder(s), elevator(s), aileron(s), and/or the speed of its propeller(s)).

In order to navigate UAV 200 to a target location, navigation module 214 may implement various navigation techniques, such as map-based navigation and localization-based navigation, for instance. With map-based navigation, UAV 200 may be provided with a map of its environment, which may then be used to navigate to a particular location on the map. With localization-based navigation, UAV 200 may be capable of navigating in an unknown environment using localization. Localization-based navigation may involve UAV 200 building its own map of its environment and calculating its position within the map and/or the position of objects in the environment. For example, as UAV 200 moves throughout its environment, UAV 200 may continuously use localization to update its map of the environment. This continuous mapping process may be referred to as simultaneous localization and mapping (SLAM). Other navigation techniques may also be utilized.

In some embodiments, navigation module 214 may navigate using a technique that relies on waypoints. In particular, waypoints are sets of coordinates that identify points in physical space. For instance, an air-navigation waypoint may be defined by a certain latitude, longitude, and altitude. Accordingly, navigation module 214 may cause UAV 200 to move from waypoint to waypoint, in order to ultimately travel to a final destination (e.g., a final waypoint in a sequence of waypoints).

In a further aspect, navigation module 214 and/or other components and systems of UAV 200 may be configured for "localization" to more precisely navigate to the scene of a target location. More specifically, it may be desirable in certain situations for a UAV to be within a threshold distance of the target location where payload 228 is being delivered by a UAV (e.g., within a few feet of the target destination). To this end, a UAV may use a two-tiered approach in which it uses a more-general location-determination technique to navigate to a general area that is associated with the target location, and then use a more-refined location-determination technique to identify and/or navigate to the target location within the general area.

For example, UAV 200 may navigate to the general area of a target destination where payload 228 is being delivered using waypoints and/or map-based navigation. The UAV may then switch to a mode in which it utilizes a localization process to locate and travel to a more specific location. For instance, if UAV 200 is to deliver a payload to a user's home, UAV 200 may need to be substantially close to the target location in order to avoid delivery of the payload to undesired areas (e.g., onto a roof, into a pool, onto a neighbor's property, etc.). However, a GPS signal may only get UAV 200 so far (e.g., within a block of the user's home). A more precise location-determination technique may then be used to find the specific target location.

Various types of location-determination techniques may be used to accomplish localization of the target delivery location once UAV 200 has navigated to the general area of the target delivery location. For instance, UAV 200 may be equipped with one or more sensory systems, such as, for example, ultrasonic sensors 204, infrared sensors (not shown), and/or other sensors, which may provide input that navigation module 214 utilizes to navigate autonomously or semi-autonomously to the specific target location.

As another example, once UAV 200 reaches the general area of the target delivery location (or of a moving subject such as a person or their mobile device), UAV 200 may switch to a "fly-by-wire" mode where it is controlled, at least in part, by a remote operator, who can navigate UAV 200 to the specific target location. To this end, sensory data from UAV 200 may be sent to the remote operator to assist them in navigating UAV 200 to the specific location.

As yet another example, UAV 200 may include a module that is able to signal to a passer-by for assistance in reaching the specific target delivery location. For example, the UAV 200 may display a visual message requesting such assistance in a graphic display or play an audio message or tone through speakers to indicate the need for such assistance, among other possibilities. Such a visual or audio message might indicate that assistance is needed in delivering UAV 200 to a particular person or a particular location, and might provide information to assist the passer-by in delivering UAV 200 to the person or location (e.g., a description or picture of the person or location, and/or the person or location's name), among other possibilities. Such a feature can be useful in a scenario in which the UAV is unable to use sensory functions or another location-determination technique to reach the specific target location. However, this feature is not limited to such scenarios.

In some embodiments, once UAV 200 arrives at the general area of a target delivery location, UAV 200 may utilize a beacon from a user's remote device (e.g., the user's mobile phone) to locate the person. Such a beacon may take various forms. As an example, consider the scenario where a remote device, such as the mobile phone of a person who requested a UAV delivery, is able to send out directional signals (e.g., via an RF signal, a light signal and/or an audio signal). In this scenario, UAV 200 may be configured to navigate by "sourcing" such directional signals—in other words, by determining where the signal is strongest and navigating accordingly. As another example, a mobile device can emit a frequency, either in the human range or outside the human range, and UAV 200 can listen for that frequency and navigate accordingly. As a related example, if UAV 200 is listening for spoken commands, then UAV 200 could utilize spoken statements, such as "I'm over here!" to source the specific location of the person requesting delivery of a payload.

In an alternative arrangement, a navigation module may be implemented at a remote computing device, which communicates wirelessly with UAV 200. The remote computing device may receive data indicating the operational state of UAV 200, sensor data from UAV 200 that allows it to assess the environmental conditions being experienced by UAV 200, and/or location information for UAV 200. Provided with such information, the remote computing device may determine altitudinal and/or directional adjustments that should be made by UAV 200 and/or may determine how UAV 200 should adjust its mechanical features (e.g., its rudder(s), elevator(s), aileron(s), and/or the speed of its propeller(s)) in order to effectuate such movements. The remote computing system may then communicate such adjustments to UAV 200 so it can move in the determined manner.

In a further aspect, UAV 200 includes one or more communication system(s) 218. Communications system(s) 218 may include one or more wireless interfaces and/or one or more wireline interfaces, which allow UAV 200 to communicate via one or more networks. Such wireless interfaces may provide for communication under one or more wireless communication protocols, such as Bluetooth, WiFi (e.g., an IEEE 802.11 protocol), Long-Term Evolution (LTE), WiMAX (e.g., an IEEE 802.16 standard), a radio-frequency ID (RFID) protocol, near-field communication (NFC), and/or other wireless communication protocols. Such wireline interfaces may include an Ethernet interface, a Universal Serial Bus (USB) interface, or similar interface to communicate via a wire, a twisted pair of wires, a coaxial cable, an optical link, a fiber-optic link, or other physical connection to a wireline network.

In some embodiments, UAV 200 may include communication systems 218 that allow for both short-range communication and long-range communication. For example, UAV 200 may be configured for short-range communications using Bluetooth and for long-range communications under a CDMA protocol. In such an embodiment, UAV 200 may be configured to function as a "hot spot;" or in other words, as a gateway or proxy between a remote support device and one or more data networks, such as a cellular network and/or the Internet. Configured as such, UAV 200 may facilitate data communications that the remote support device would otherwise be unable to perform by itself.

For example, UAV 200 may provide a WiFi connection to a remote device, and serve as a proxy or gateway to a cellular service provider's data network, which the UAV might connect to under an LTE or a 3G protocol, for instance. UAV 200 could also serve as a proxy or gateway to a high-altitude balloon network, a satellite network, or a combination of these networks, among others, which a remote device might not be able to otherwise access.

In a further aspect, UAV 200 may include power system(s) 220. Power system(s) 220 may include one or more batteries for providing power to UAV 200. In one example, the one or more batteries may be rechargeable and each battery may be recharged via a wired connection between the battery and a power supply and/or via a wireless charging system, such as an inductive charging system that applies an external time-varying magnetic field to an internal battery.

UAV 200 may employ various systems and configurations in order to transport and deliver payload 228. In some implementations, payload 228 of UAV 200 may include or take the form of a "package" designed to transport various goods to a target delivery location. For example, UAV 200 can include a compartment, in which an item or items may be transported. Such a package may one or more food items, purchased goods, medical items, or any other object(s) having a size and weight suitable to be transported between two locations by the UAV. In other embodiments, payload 228 may simply be the one or more items that are being delivered (e.g., without any package housing the items).

In some embodiments, payload 228 may be attached to the UAV and located substantially outside of the UAV during some or all of a flight by the UAV. For example, the package may be tethered or otherwise releasably attached below the UAV during flight to a target location. In an embodiment where a package carries goods below the UAV, the package may include various features that protect its contents from the environment, reduce aerodynamic drag on the system, and prevent the contents of the package from shifting during UAV flight.

In order to deliver the payload, the UAV may include winch system 221 controlled by tether control module 216 in order to lower payload 228 to the ground while UAV 200 hovers above. As shown in FIG. 2, winch system 221 may include tether 224, and tether 224 may be coupled to payload 228 by payload coupling apparatus 226. In some cases, payload coupling apparatus 226 and payload 228 may be collectively referred to as a tethered component. Tether 224 may be wound on a spool that is coupled to motor 222 of the UAV. Motor 222 may take the form of a DC motor (e.g., a servo motor) that can be actively controlled by a speed controller. Tether control module 216 can control the speed controller to cause motor 222 to rotate the spool, thereby unwinding or retracting tether 224 and lowering or raising payload coupling apparatus 226. In practice, the speed controller may output a desired operating rate (e.g., a desired RPM) for the spool, which may correspond to the speed at which tether 224 and payload 228 should be lowered towards the ground. Motor 222 may then rotate the spool so that it maintains the desired operating rate.

In order to control motor 222 via the speed controller, tether control module 216 may receive data from a speed sensor (e.g., an encoder) configured to convert a mechanical position to a representative analog or digital signal. In particular, the speed sensor may include a rotary encoder that may provide information related to rotary position (and/or rotary movement) of a shaft of the motor or the spool coupled to the motor, among other possibilities. Moreover, the speed sensor may take the form of an absolute encoder and/or an incremental encoder, among others. So in an example implementation, as motor 222 causes rotation of the spool, a rotary encoder may be used to measure this rotation. In doing so, the rotary encoder may be used to convert a rotary position to an analog or digital electronic signal used by tether control module 216 to determine the amount of rotation of the spool from a fixed reference angle and/or to an analog or digital electronic signal that is representative of a new rotary position, among other options. Other examples are also possible.

Based on the data from the speed sensor, tether control module 216 may determine a rotational speed of motor 222 and/or the spool and responsively control motor 222 (e.g., by increasing or decreasing an electrical current supplied to motor 222) to cause the rotational speed of motor 222 to match a desired speed. When adjusting the motor current, the magnitude of the current adjustment may be based on a proportional-integral-derivative (PID) calculation using the determined and desired speeds of motor 222. For instance, the magnitude of the current adjustment may be based on a present difference, a past difference (based on accumulated error over time), and a future difference (based on current rates of change) between the determined and desired speeds of the spool.

In some embodiments, tether control module 216 may vary the rate at which tether 224 and payload 228 are lowered to the ground. For example, the speed controller may change the desired operating rate according to a variable deployment-rate profile and/or in response to other factors in order to change the rate at which payload 228 descends toward the ground. To do so, tether control module 216 may adjust an amount of braking or an amount of friction that is applied to tether 224. For example, to vary the tether deployment rate, UAV 200 may include friction pads that can apply a variable amount of pressure to tether 224. As another example, UAV 200 can include a motorized braking system that varies the rate at which the spool lets out tether 224. Such a braking system may take the form of an electromechanical system in which motor 222 operates to slow the rate at which the spool lets out tether 224. Further, motor 222 may vary the amount by which it adjusts the speed (e.g., the RPM) of the spool, and thus may vary the deployment rate of tether 224. Other examples are also possible.

In some embodiments, tether control module 216 may be configured to limit the motor current supplied to motor 222 to a maximum value. With such a limit placed on the motor current, there may be situations where motor 222 cannot operate at the desired rate specified by the speed controller. For instance, there may be situations where the speed controller specifies a desired operating rate at which motor 222 should retract tether 224 toward UAV 200, but the motor current may be limited such that a large enough downward force on tether 224 would counteract the retracting force of motor 222 and cause tether 224 to unwind instead. A limit on the motor current may be imposed and/or altered depending on an operational state of UAV 200.

In some embodiments, tether control module 216 may be configured to determine a status of tether 224 and/or payload 228 based on the amount of current supplied to motor 222. For instance, if a downward force is applied to tether 224 (e.g., if payload 228 is attached to tether 224 or if tether 224 gets snagged on an object when retracting toward UAV 200), tether control module 216 may need to increase the motor current in order to cause the determined rotational speed of motor 222 and/or spool to match the desired speed. Similarly, when the downward force is removed from tether 224 (e.g., upon delivery of payload 228 or removal of a tether snag), tether control module 216 may need to decrease the motor current in order to cause the determined rotational speed of motor 222 and/or spool to match the desired speed. As such, tether control module 216 may be configured to monitor the current supplied to motor 222. For instance, tether control module 216 could determine the motor current based on sensor data received from a current sensor of the motor or a current sensor of power system 220. In any case, based on the current supplied to motor 222, tether control module 216 may determine if payload 228 is attached to tether 224, if someone or something is pulling on tether 224, and/or if payload coupling apparatus 226 is pressing against UAV 200 after retracting tether 224. Other examples are possible as well.

During delivery of payload 228, payload coupling apparatus 226 can be configured to secure payload 228 while being lowered from the UAV by tether 224, and can be further configured to release payload 228 upon reaching ground level. Payload coupling apparatus 226 can then be retracted to the UAV by reeling in tether 224 using motor 222.

In some implementations, payload 228 may be passively released once it is lowered to the ground. For example, a passive release mechanism may include one or more swing arms adapted to retract into and extend from a housing. An extended swing arm may form a hook on which payload 228 may be attached. Upon lowering the release mechanism and payload 228 to the ground via a tether, a gravitational force as well as a downward inertial force on the release mechanism may cause payload 228 to detach from the hook allowing the release mechanism to be raised upwards toward the UAV. The release mechanism may further include a spring mechanism that biases the swing arm to retract into the housing when there are no other external forces on the swing arm. For instance, a spring may exert a force on the swing arm that pushes or pulls the swing arm toward the housing such that the swing arm retracts into the housing once the weight of payload 228 no longer forces the swing arm to extend from the housing. Retracting the swing arm into the housing may reduce the likelihood of the release mechanism snagging payload 228 or other nearby objects when raising the release mechanism toward the UAV upon delivery of payload 228.

Active payload release mechanisms are also possible. For example, sensors such as a barometric pressure based altimeter and/or accelerometers may help to detect the position of the release mechanism (and the payload) relative to the ground. Data from the sensors can be communicated back to the UAV and/or a control system over a wireless link and used to help in determining when the release mechanism has reached ground level (e.g., by detecting a measurement with the accelerometer that is characteristic of ground impact). In other examples, the UAV may determine that the payload has reached the ground based on a weight sensor detecting a threshold low downward force on the tether and/or based on a threshold low measurement of power drawn by the winch when lowering the payload.

Other systems and techniques for delivering a payload, in addition or in the alternative to a tethered delivery system are also possible. For example, UAV 200 could include an air-bag drop system or a parachute drop system. Alternatively, UAV 200 carrying a payload could simply land on the ground at a delivery location. Other examples are also possible.

IV. Example UAV Deployment Systems

UAV systems may be implemented in order to provide various UAV-related services. In particular, UAVs may be provided at a number of different launch sites that may be in communication with regional and/or central control systems. Such a distributed UAV system may allow UAVs to be quickly deployed to provide services across a large geographic area (e.g., that is much larger than the flight range of any single UAV). For example, UAVs capable of carrying payloads may be distributed at a number of launch sites across a large geographic area (possibly even throughout an entire country, or even worldwide), in order to provide on-demand transport of various items to locations throughout the geographic area. FIG. 3 is a simplified block diagram illustrating a distributed UAV system 300, according to an example embodiment.

In the illustrative UAV system 300, access system 302 may allow for interaction with, control of, and/or utilization of a network of UAVs 304. In some embodiments, access system 302 may be a computing system that allows for human-controlled dispatch of UAVs 304. As such, the control system may include or otherwise provide a user interface through which a user can access and/or control UAVs 304.

In some embodiments, dispatch of UAVs 304 may additionally or alternatively be accomplished via one or more automated processes. For instance, access system 302 may dispatch one of UAVs 304 to transport a payload to a target location, and the UAV may autonomously navigate to the target location by utilizing various on-board sensors, such as a GPS receiver and/or other various navigational sensors.

Further, access system 302 may provide for remote operation of a UAV. For instance, access system 302 may allow an operator to control the flight of a UAV via its user interface. As a specific example, an operator may use access system 302 to dispatch one of UAVs 304 to a target location. The dispatched UAV may then autonomously navigate to the general area of the target location. At this point, the operator may use access system 302 to take control of the dispatched UAV and navigate the dispatched UAV to the target location (e.g., to a particular person to whom a payload is being transported). Other examples of remote operation of a UAV are also possible.

In an illustrative embodiment, UAVs 304 may take various forms. For example, each of UAVs 304 may be a UAV such as those illustrated in FIG. 1A, 1B, 1C, 1D, 1E, or 2. However, UAV system 300 may also utilize other types of UAVs without departing from the scope of the invention. In some implementations, all of UAVs 304 may be of the same or a similar configuration. However, in other implementations, UAVs 304 may include a number of different types of UAVs. For instance, UAVs 304 may include a number of types of UAVs, with each type of UAV being configured for a different type or types of payload delivery capabilities.

UAV system 300 may further include remote device 306, which may take various forms. Generally, remote device 306 may be any device through which a direct or indirect request to dispatch a UAV can be made. Note that an indirect request may involve any communication that may be responded to by dispatching a UAV, such as requesting a package delivery. In an example embodiment, remote device 306 may be a mobile phone, tablet computer, laptop computer, personal computer, or any network-connected computing device. Further, in some instances, remote device 306 may not be a computing device. As an example, a standard telephone, which allows for communication via plain old telephone service (POTS), may serve as remote device 306. Other types of remote devices are also possible.

Further, remote device 306 may be configured to communicate with access system 302 via one or more types of communication network(s) 308. For example, remote device 306 may communicate with access system 302 (or a human operator of access system 302) by communicating over a POTS network, a cellular network, and/or a data network such as the Internet. Other types of networks may also be utilized.

In some embodiments, remote device 306 may be configured to allow a user to request pick-up of one or more items from a certain source location and/or delivery of one or more items to a desired location. For example, a user could request UAV delivery of a package to their home via their mobile phone, tablet, or laptop. As another example, a user could request dynamic delivery to wherever they are located at the time of delivery. To provide such dynamic delivery, UAV system 300 may receive location information (e.g., GPS coordinates, etc.) from the user's mobile phone, or any other device on the user's person, such that a UAV can navigate to the user's location (as indicated by their mobile phone).

In an illustrative arrangement, central dispatch system 310 may be a server or group of servers, which is configured to receive dispatch messages requests and/or dispatch instructions from access system 302. Such dispatch messages may request or instruct central dispatch system 310 to coordinate the deployment of UAVs to various target locations. Central dispatch system 310 may be further configured to route such requests or instructions to one or more local dispatch systems 312. To provide such functionality, central dispatch system 310 may communicate with access system 302 via a data network, such as the Internet or a private network that is established for communications between access systems and automated dispatch systems.

In the illustrated configuration, central dispatch system 310 may be configured to coordinate the dispatch of UAVs 304 from a number of different local dispatch systems 312. As such, central dispatch system 310 may keep track of which ones of UAVs 304 are located at which ones of local dispatch systems 312, which UAVs 304 are currently available for deployment, and/or which services or operations each of UAVs 304 is configured for (in the event that a UAV fleet includes multiple types of UAVs configured for different services and/or operations). Additionally or alternatively, each local dispatch system 312 may be configured to track which of its associated UAVs 304 are currently available for deployment and/or are currently in the midst of item transport.

In some cases, when central dispatch system 310 receives a request for UAV-related service (e.g., transport of an item) from access system 302, central dispatch system 310 may select a specific one of UAVs 304 to dispatch. Central dispatch system 310 may accordingly instruct local dispatch system 312 that is associated with the selected UAV to dispatch the selected UAV. Local dispatch system 312 may then operate its associated deployment system 314 to launch the selected UAV. In other cases, central dispatch system 310 may forward a request for a UAV-related service to one of local dispatch systems 312 that is near the location where the support is requested and leave the selection of a particular one of UAVs 304 to local dispatch system 312.

In an example configuration, local dispatch system 312 may be implemented as a computing system at the same location as deployment system(s) 314 that it controls. For example, a particular one of local dispatch system 312 may be implemented by a computing system installed at a building, such as a warehouse, where deployment system(s) 314 and UAV(s) 304 that are associated with the particular one of local dispatch systems 312 are also located. In other embodiments, the particular one of local dispatch systems 312 may be implemented at a location that is remote to its associated deployment system(s) 314 and UAV(s) 304.

Numerous variations on and alternatives to the illustrated configuration of UAV system 300 are possible. For example, in some embodiments, a user of remote device 306 could request delivery of a package directly from central dispatch system 310. To do so, an application may be implemented on remote device 306 that allows the user to provide information regarding a requested delivery, and generate and send a data message to request that UAV system 300 provide the delivery. In such an embodiment, central dispatch system 310 may include automated functionality to handle requests that are generated by such an application, evaluate such requests, and, if appropriate, coordinate with an appropriate local dispatch system 312 to deploy a UAV.

Further, some or all of the functionality that is attributed herein to central dispatch system 310, local dispatch system(s) 312, access system 302, and/or deployment system(s) 314 may be combined in a single system, implemented in a more complex system (e.g., having more layers of control), and/or redistributed among central dispatch system 310, local dispatch system(s) 312, access system 302, and/or deployment system(s) 314 in various ways.

Yet further, while each local dispatch system 312 is shown as having two associated deployment systems 314, a given local dispatch system 312 may alternatively have more or fewer associated deployment systems 314. Similarly, while central dispatch system 310 is shown as being in communication with two local dispatch systems 312, central dispatch system 310 may alternatively be in communication with more or fewer local dispatch systems 312.

In a further aspect, deployment systems 314 may take various forms. In some implementations, some or all of deployment systems 314 may be a structure or system that passively facilitates a UAV taking off from a resting position to begin a flight. For example, some or all of deployment systems 314 may take the form of a landing pad, a hangar, and/or a runway, among other possibilities. As such, a given deployment system 314 may be arranged to facilitate deployment of one UAV 304 at a time, or deployment of multiple UAVs (e.g., a landing pad large enough to be utilized by multiple UAVs concurrently).

Additionally or alternatively, some or all of deployment systems 314 may take the form of or include systems for actively launching one or more of UAVs 304. Such launch systems may include features that provide for an automated UAV launch and/or features that allow for a human-assisted UAV launch. Further, a given deployment system 314 may be configured to launch one particular UAV 304, or to launch multiple UAVs 304.

Note that deployment systems 314 may also be configured to passively facilitate and/or actively assist a UAV when landing. For example, the same landing pad could be used for take-off and landing. Deployment system 314 could also include other structures and/or systems to assist and/or facilitate UAV landing processes.

Deployment systems 314 may further be configured to provide additional functions, including for example, diagnostic-related functions such as verifying system functionality of the UAV, verifying functionality of devices that are housed within a UAV (e.g., a payload delivery apparatus), and/or maintaining devices or other items that are housed in the UAV (e.g., by monitoring a status of a payload such as its temperature, weight, etc.).

In some embodiments, local dispatch systems 312 (along with their respective deployment system(s) 314 may be strategically distributed throughout an area such as a city. For example, local dispatch systems 312 may be strategically distributed such that each local dispatch systems 312 is proximate to one or more payload pickup locations (e.g., near a restaurant, store, or warehouse). However, local dispatch systems 312 may be distributed in other ways, depending upon the particular implementation.

As an additional example, kiosks that allow users to transport packages via UAVs may be installed in various locations. Such kiosks may include UAV launch systems, and may allow a user to provide their package for loading onto a UAV and pay for UAV shipping services, among other possibilities. Other examples are also possible.

In a further aspect, UAV system 300 may include or have access to user-account database 316. User-account database 316 may include data for a number of user accounts, and which are each associated with one or more person. For a given user account, user-account database 316 may include data related to or useful in providing UAV-related services. Typically, the user data associated with each user account is optionally provided by an associated user and/or is collected with the associated user's permission.

Further, in some embodiments, a person may be required to register for a user account with UAV system 300, if they wish to be provided with UAV-related services by UAVs 304 from UAV system 300. As such, user-account database 316 may include authorization information for a given user account (e.g., a user name and password), and/or other information that may be used to authorize access to a user account.

In some embodiments, a person may associate one or more of their devices with their user account, such that they can access the services of UAV system 300. For example, when a person uses an associated mobile phone to, e.g., place a call to an operator of access system 302 or send a message requesting a UAV-related service to a dispatch system, the phone may be identified via a unique device identification number, and the call or message may then be attributed to the associated user account. Other examples are also possible.

V. Example Tether-Based Altitude Determination at Payload Drop-Off

Figure 4B:
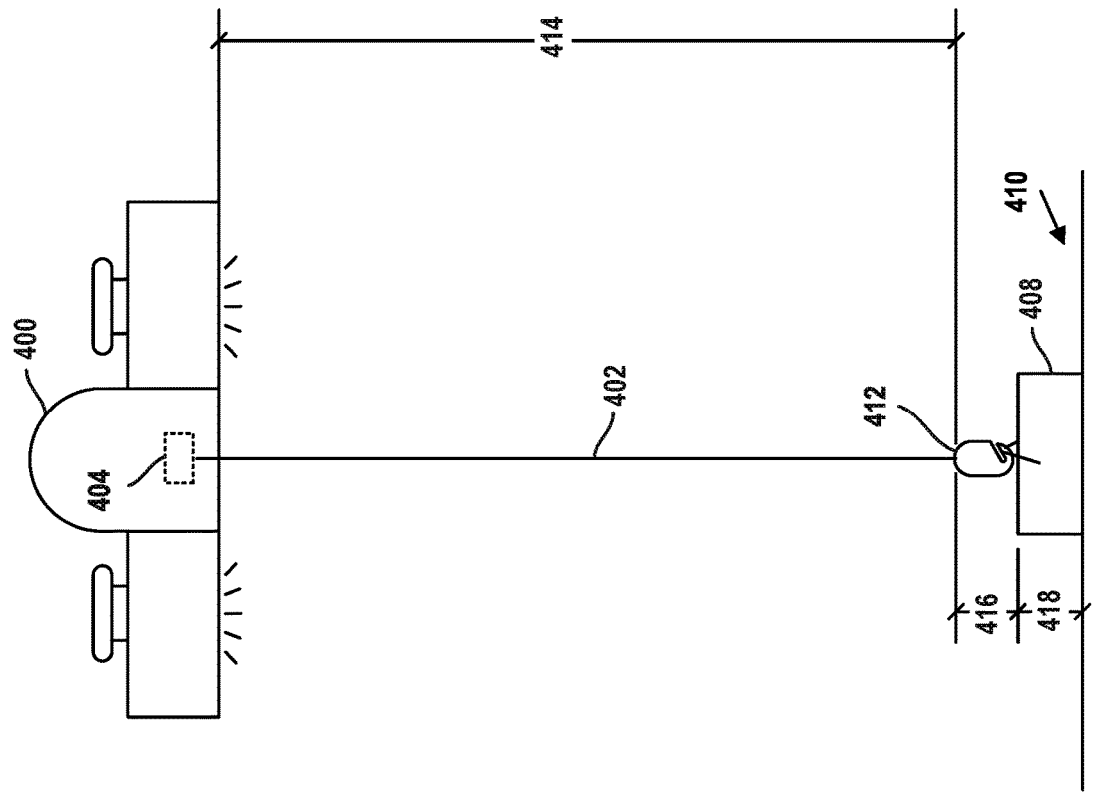
FIGS. 4A and 4B illustrate aspects of payload drop-off, in accordance with examples described herein.
Figure 4A:
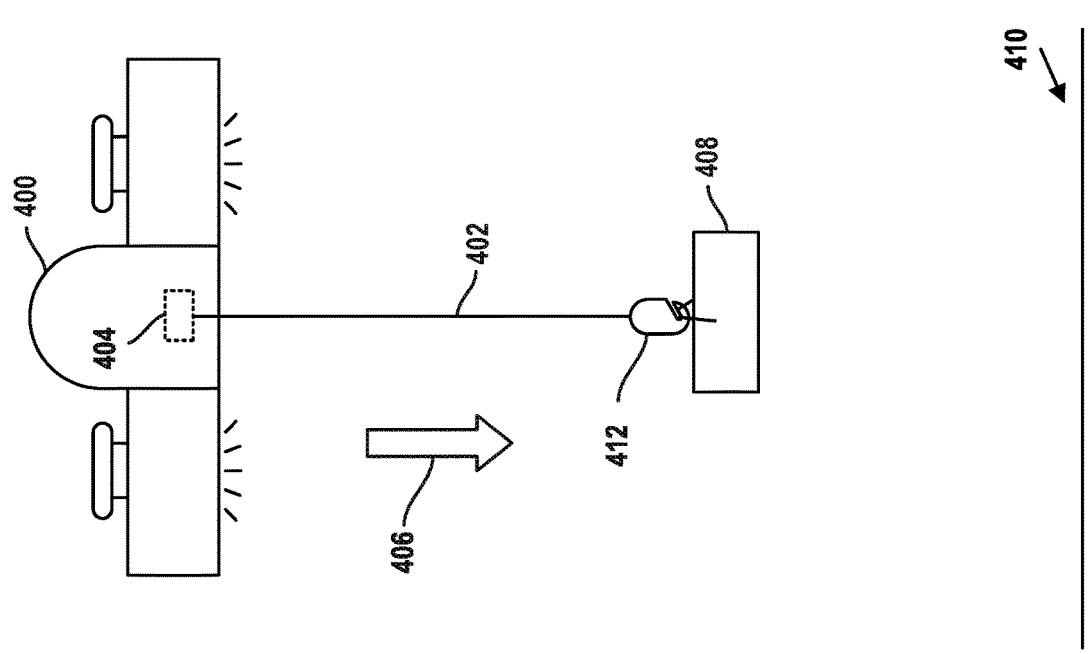
Figure 4C:
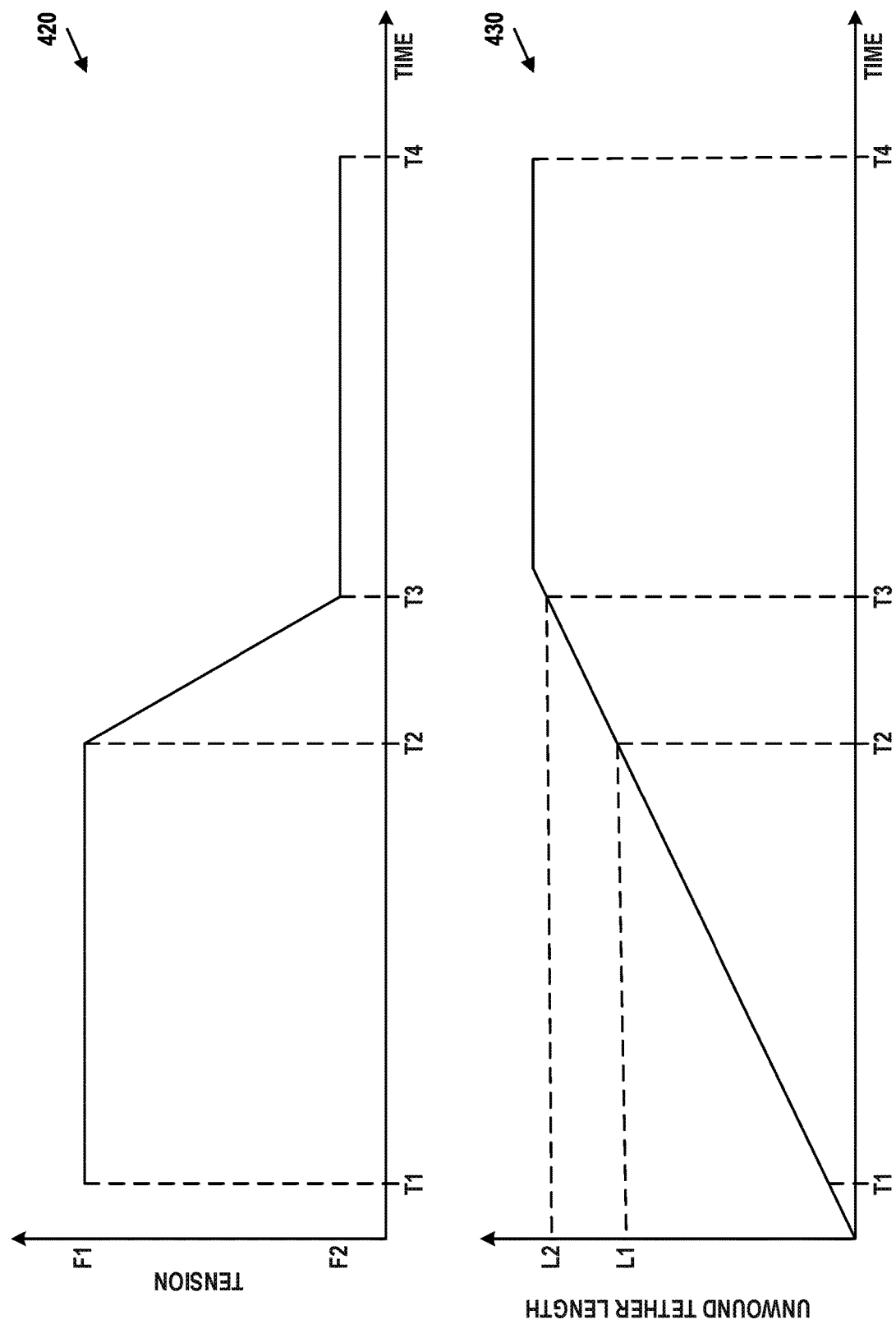
FIG. 4C illustrates graphs of tether tension and unwound tether length, in accordance with examples described herein.

FIGS. 4A, 4B, and 4C illustrate aspects of an example process for determining an altitude of an aerial vehicle based on a length of tether deployed (e.g., released and/or unwound) from the aerial vehicle during payload drop-off. Specifically, FIGS. 4A and 4B illustrate aerial vehicle 400 that includes a winch system configured for pickup and drop-off of payloads. Aerial vehicle 400 may be one implementation of UAV 200. The winch system may include tether 402 coupled to spool 404, a motor configured to apply a torque to the spool, and payload coupling apparatus 412. FIGS. 4A and 4B show aerial vehicle 400 and the winch system being used to drop-off payload 408, as indicated by arrow 406.

Spool 404 may be operated to unwind tether 402 to lower payload coupling apparatus 412 and/or payload 408 from aerial vehicle 400 to ground surface 410 using tether 402, or to wind tether 402 to lift payload coupling apparatus 412 and/or payload 408 from ground surface 410 to aerial vehicle 400 using tether 402. Payload 408 may be an item for transport from a pickup location to a delivery destination, and may include a package, parcel, container, or other structure that is configured to interface with payload coupling apparatus 412. The winch system of aerial vehicle 400 may operate to autonomously pick-up or drop-off payload 408 in a controlled manner while aerial vehicle 400 hovers above payload 408. Payload coupling apparatus 412, payload 408, and/or any other objects connected to the bottom/leading end of tether 402 may be referred to as a tethered component(s).

As shown in FIG. 4A, spool 404 may be operated (e.g., by controlling motor 222 of FIG. 2) such that payload coupling apparatus 412 and/or payload 408 are lowered to ground surface 410. While FIGS. 4A and 4B illustrate both payload coupling apparatus 412 and payload 408 being lowered, the operations discussed herein may also be used with an empty payload coupling apparatus 412 and/or another tethered component. As payload coupling apparatus 412 and payload 408 are lowered toward ground surface 410, sensor data may be received from one or more sensors on aerial vehicle 400, tether 402, and/or on payload coupling apparatus 412 to monitor the descent of payload coupling apparatus 412 and/or payload 408.

Specifically, one or more sensors may be configured to generate sensor data that indicates a tension experienced by tether 402 while payload coupling apparatus 412 and/or payload 408 are being lowered from aerial vehicle 400. This sensor data may be used to determine a ground contact time at which payload coupling apparatus 412 and/or payload 408 makes initial contact with ground surface 410, as illustrated in FIG. 4B. When payload 408 is connected to payload coupling apparatus 412, the ground contact time may represent a time at which payload 408 makes initial contact with ground surface 410. When payload coupling apparatus 412 is empty, the ground contact time may represent a time at which payload coupling apparatus 412 makes initial contact with ground surface 410.

Additionally or alternatively, the ground contact time may be determined based on sensor data obtained from other sensors provided on aerial vehicle 400 and/or payload 408, such as image data, inertial measurement unit data, and/or a rotational velocity of spool 404, among other possibilities. For example, while payload coupling apparatus 412 and/or payload 408 are being lowered, the downward weight thereof may cause tether 402 to be unspooled, resulting in spool 404 rotating at constant angular velocity due to the motor resisting the downward weight. Upon contacting ground surface 410, the angular velocity of spool 404 may go to approximately zero as the downward weight stops unspooling tether 402, thus indicating that payload 408 or payload coupling apparatus 412 has contacted ground surface 410.

At the ground contact time, tether 402 may form an approximately vertical line between aerial vehicle 400 and payload coupling apparatus 412, as shown in FIG. 4B. This vertical line may be considered to extend through payload coupling apparatus 412 and/or payload 408 to a point on ground surface 410. Accordingly, length 414 of tether 402 deployed from aerial vehicle 400, height 416 of payload coupling apparatus 412, and/or height 418 of payload 408 may be indicative of an altitude of aerial vehicle 400. Specifically, when payload 408 is connected to payload coupling apparatus 412, a tether-based altitude of aerial vehicle may be determined based on a sum of (i) length 414, (ii) height 416, and (iii) height 418. When payload coupling apparatus 412 is empty, a tether-based altitude of aerial vehicle may be determined based on a sum of (i) length 414 and (ii) height 416.

Height 416 of payload coupling apparatus 412 may be determined based on the specific design of payload coupling apparatus 412 utilized by aerial vehicle 400, and may thus be constant unless the design and/or model thereof is modified. Height 418 of payload 408 may be based on the specific design of payload 408 picked up by aerial vehicle 400, and may be determined, for example, using an identifier (e.g., barcode, RFID tag, etc.) included on payload 408. In implementations that allow payload 408 to be picked up by payload coupling apparatus 412 in multiple ways, height 418 may be further based on an orientation in which payload 408 is held by payload coupling apparatus 412.

FIG. 4C includes graph 420 illustrating a tension on tether 402 during the drop-off of payload 408, and graph 430 illustrating a length of tether 402 deployed from aerial vehicle 400 during the drop-off of payload 408. In some implementations, the tension on tether 402 may be measured using a force sensor (e.g., a load cell), which may be positioned in-line (i.e., serially) with tether 402. Additionally or alternatively, the tension on tether 402 may be determined based on a torque applied to spool 404 by the motor and a radius of spool 404. The radium may be variable as tether 402 is wound and/or unwound from spool 404. The torque applied by the motor may be proportional to a current applied to the motor.

The length of tether 402 deployed from aerial vehicle 400 may be determined based on the radius of spool 404 and a number of revolutions of spool 404. For example, a motor position encoder may be used to determine a number of revolutions of the spool between (i) full retraction of tether 402 and (ii) a current deployment of tether 402. Additionally or alternatively, the length of tether 402 deployed from aerial vehicle 400 may be determined based on linear position indications included on and/or in tether 402, such as visual markings on tether 402 and/or electronic and/or magnetic components (e.g., RFID tags, magnetic tags) embedded in tether 402. Such linear position indications may be utilized, for example, in implementations that release and retract tether 402 without utilizing a spool.

As shown in graph 420, from time T1 to time T2, the tension on tether 402 remains approximately constant at F1 while payload 408 is being lowered towards ground surface 410. Tension F1 may be the result of payload 408 being lowered at constant velocity, as indicated by the constant slope of the corresponding portion of graph 430.

Upon contacting ground surface 410 at time T2, the amount of tension on tether 402 begins to drop from F1 to F2, reaching tension F2 at time T3. During this time, the weight of payload 408 and/or payload coupling apparatus 412 becomes increasingly supported by ground surface 410 rather than tether 402. From time T2 to T3, tether 402 may continue to be released from aerial vehicle 400, eventually coming to a stop after time T3.

From time T3 to time T4, the amount of tension on tether 402 remains approximately constant at F2 while tether 402 is no longer supporting the weight of payload coupling apparatus 412 and/or payload 408. Tension F2 may be the result of aerial vehicle 400 supporting the weight of a non-slacked portion of tether 402 that extends between aerial vehicle 400 and ground surface 410.

Accordingly, a time between T2 and T3, inclusive, may be selected as the ground contact time, and a length between L1 and L2 may thus represent the length of tether 402 unwound at the ground contact time. In one example, time T2 may be considered the ground contact time, and length L1 may thus represent the length of tether 402 unwound at the ground contact time. In another example, time (T2+T3)/2 (i.e., the midpoint of the interval from T2 to T3) may be considered the ground contact time, and length (L1+L2)/2 (i.e., the midpoint of the interval from L1 to L2) may thus represent the length of tether 402 unwound at the ground contact time. In a further example, time T3 may be considered the ground contact time, and length L2 may thus represent the length of tether 402 unwound at the ground contact time.

The specific time between T2 and T3, inclusive, selected as the ground contact time may depend on, for example, an elasticity and/or stretchability of tether 402. When a non-elastic and/or non-stretchable tether is used, a time closer to time T2 (e.g., T2 itself) may be selected as the ground contact time. When a highly elastic and/or highly stretchable tether is used, a time closer to time T3 (e.g., T3 itself) may be selected as the ground contact time. In many practical applications, the difference between length L1 and L2 may be small and/or insignificant relative to the length L1 and/or L2. Thus, any length between L1 and L2, inclusive, may be usable to determine the tether-based altitude of aerial vehicle 400.

In some implementations, the tether-based altitude of aerial vehicle 400 may be determined multiple times, and an average of these multiple measurements may be used as a final tether-based altitude measurement. That is, the operations shown and described with respect to FIGS. 4A, 4B, and 4C may be performed multiple times. For example, after payload 408 is dropped off on ground surface 410 and payload coupling apparatus 412 is detached therefrom, aerial vehicle 400 may retract and lower payload coupling apparatus 412 back down to ground surface 410 one or more times. Thus, one or more additional ground contact times and one or more corresponding unwound tether lengths may be determined and used to generate one or more corresponding tether-based altitude measurements. Accordingly, in some cases, the tether-based altitude may be determined as part of (e.g., incidentally to) a payload drop-off operations, while in other cases the tether-based altitude may be determined as part of dedicated tether-based altitude measurement operations.

VI. Example Tether-Based Altitude Determination at Payload Pick-Up

Figure 5B:
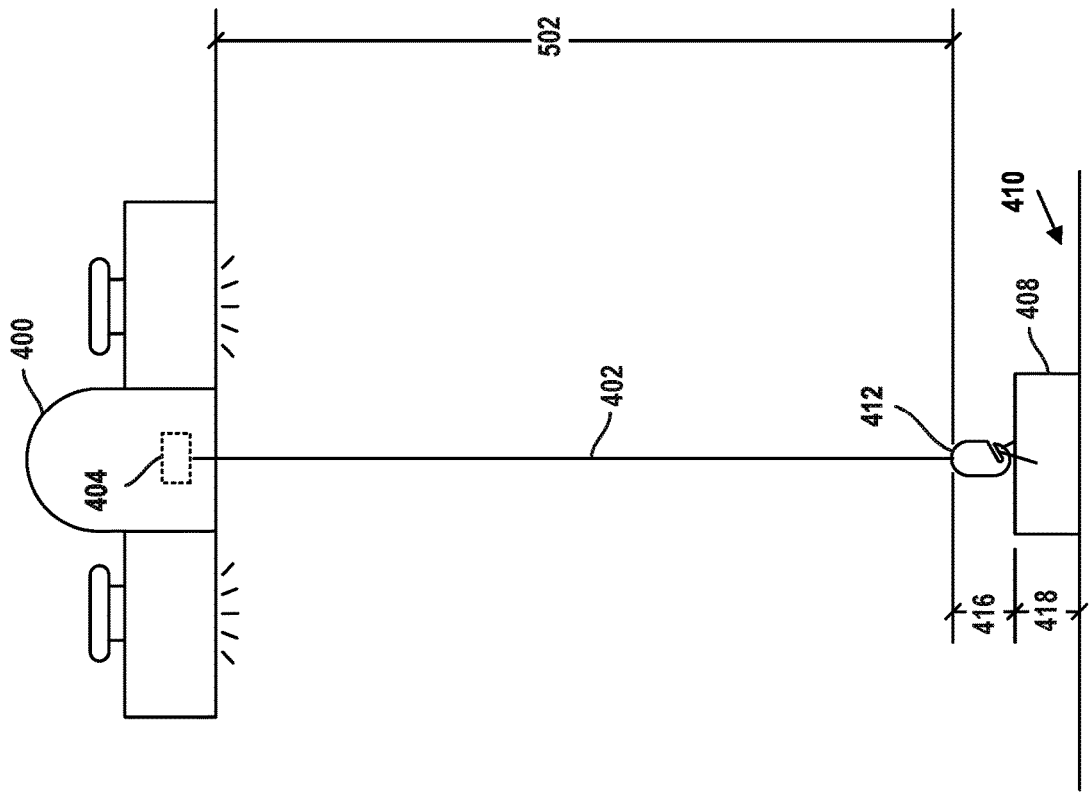
FIGS. 5A and 5B illustrate aspects of payload pick-up, in accordance with examples described herein.
Figure 5A:
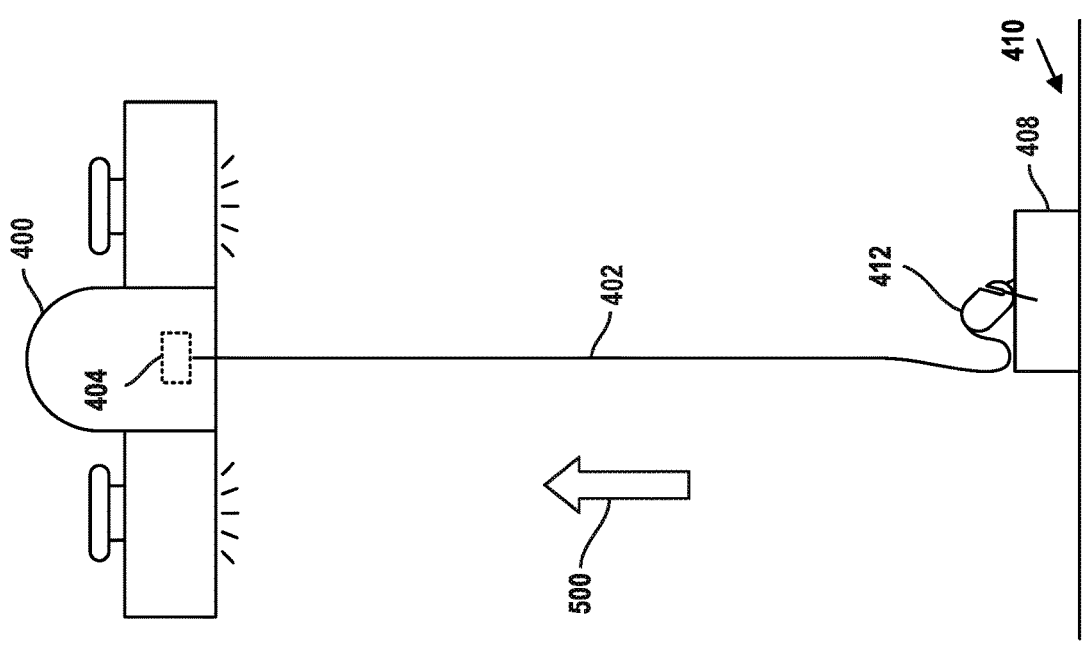
Figure 5C:
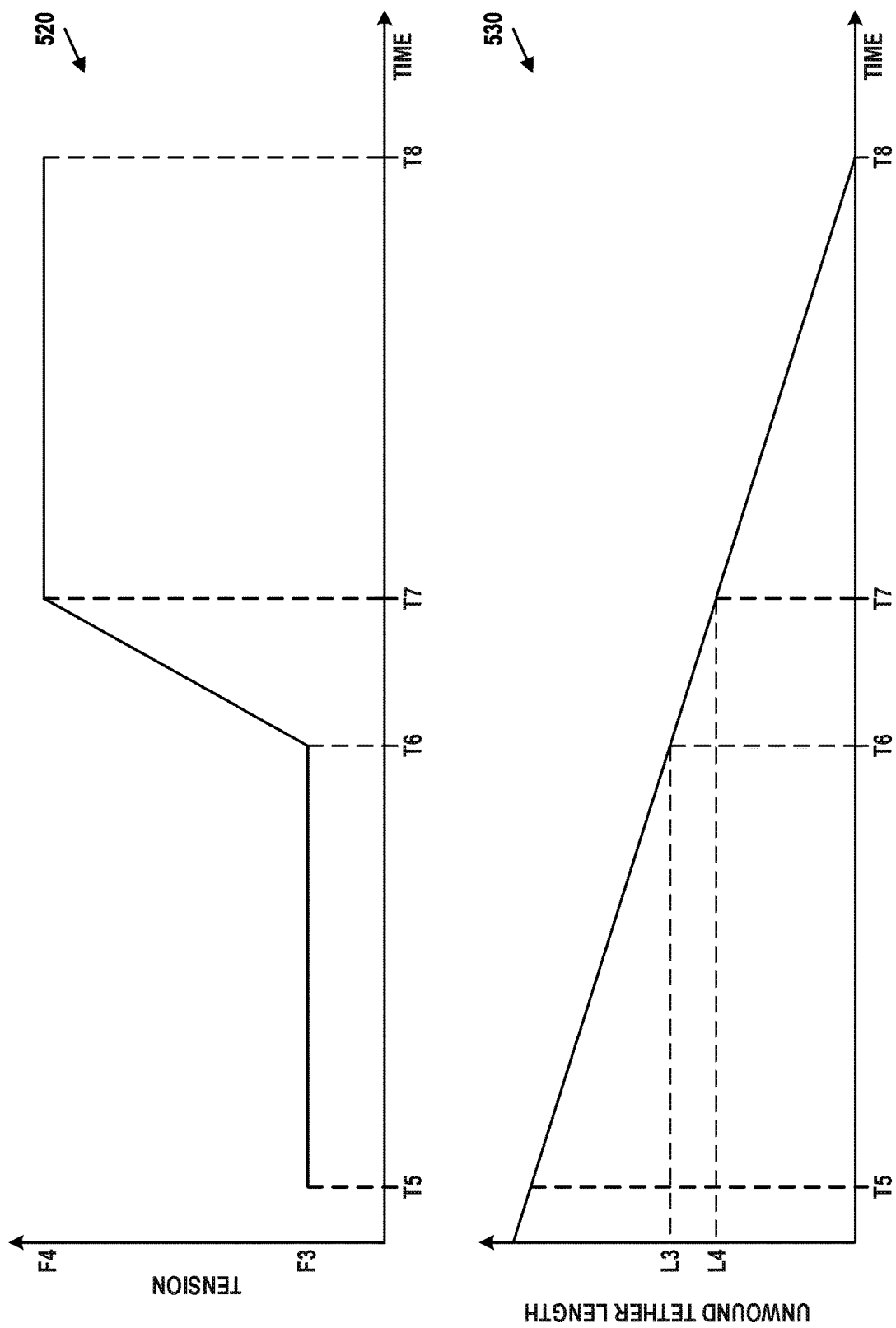
FIG. 5C illustrates graphs of tether tension and unwound tether length, in accordance with examples described herein.

FIGS. 5A, 5B, and 5C illustrate aspects of an example process for determining an altitude of an aerial vehicle based on a length of tether deployed from the aerial vehicle during payload pick-up. Specifically, FIGS. 5A and 5B show aerial vehicle 400 and the winch system being used to pick-up payload 408, as indicated by arrow 500.

As shown in FIGS. 5A and 5B, spool 404 may be operated (e.g., by controlling motor 222 of FIG. 2) such that, after attaching payload coupling apparatus 412 to payload 408, slack is removed from tether 402 and payload 408 is picked up from ground surface 410. While FIGS. 5A and 5B illustrate both payload coupling apparatus 412 and payload 408 being lifted off of ground surface 410, the operations discussed herein may be used with an empty payload coupling apparatus 412 and/or another tethered component.

As payload coupling apparatus 412 and/or payload 408 are picked up from ground surface 410, one or more sensors may be configured to generate sensor data that indicates a tension experienced by tether 402. This sensor data may be used to determine a ground lift-off time at which payload coupling apparatus 412 and/or payload 408 is lifted off of ground surface 410, as illustrated in FIG. 4B. When payload 408 is connected to payload coupling apparatus 412, the ground lift-off time may represent a time at which payload 408 is lifted off of ground surface 410. When payload coupling apparatus 412 is empty, the ground contact time may represent a time at which payload coupling apparatus 412 is lifted off of ground surface 410. Additionally or alternatively, the ground lift-off time may be determined based on sensor data obtained from other sensors provided on aerial vehicle 400 and/or payload 408, such as image data and/or inertial measurement unit data, among other possibilities.

At the ground lift-off time, tether 402 may form an approximately vertical line between aerial vehicle 400 and payload coupling apparatus 412, as shown in FIG. 5B. This vertical line may be considered to extend through payload coupling apparatus 412 and/or payload 408 to a point on ground surface 410. Accordingly, length 502 of tether 402 deployed from aerial vehicle 400, height 416 of payload coupling apparatus 412, and/or height 418 of payload 408 may be indicative of an altitude of aerial vehicle 400. Specifically, when payload 408 is connected to payload coupling apparatus 412, a tether-based altitude of aerial vehicle 400 may be determined based on a sum of (i) length 502, (ii) height 416, and (iii) height 418. When payload coupling apparatus 412 is empty, a tether-based altitude of aerial vehicle 400 may be determined based on a sum of (i) length 502 and (ii) height 416.

FIG. 5C includes graph 520 illustrating a tension on tether 402 during the pick-up of payload 408, and graph 530 illustrating a length of tether 402 deployed from aerial vehicle 400 during the pick-up of payload 408. As shown in graph 520, from time T5 to time T6, the tension on tether 402 remains approximately constant at F3 while tether 402 is being retracted to remove slack therefrom. Tension F3 may be the result of aerial vehicle 400 supporting the weight of the non-slacked portion of tether 402 that extends between aerial vehicle 400 and ground surface 410.

At time T6, the amount of tension on tether 402 begins to increase from F3 to F4, reaching tension F4 at time T7. During this time, the weight of payload 408 and/or payload coupling apparatus 412 becomes increasingly supported by tether 402 rather than ground surface 410. From time T6 to T7, tether 402 may continue to be retracted into aerial vehicle 400, and may eventually start supporting the entire weight of payload 408 and/or payload coupling apparatus 412.

From time T7 to time T8, the amount of tension on tether 402 remains approximately constant at F4 while tether 402 is used to support the weight of payload coupling apparatus 412 and/or payload 408. Tension F4 may be the result of payload 408 being lifted up at constant velocity, as indicated by the constant slope of the corresponding portion of graph 530.

Accordingly, a time between T6 and T7, inclusive, may be selected as the ground lift-off time, and a length between L3 and L4 may thus represent the length of tether 402 unwound at the ground lift-off time. In one example, time T6 may be considered the ground lift-off time, and length L3 may thus represent the length of tether 402 unwound at the ground lift-off time. In another example, time (T6+T7)/2 (i.e., the midpoint of the interval from T6 to T7) may be considered the ground lift-off time, and length (L3+L4)/2 (i.e., the midpoint of the interval from L3 to L4) may thus represent the length of tether 402 unwound at the ground lift-off time. In a further example, time T7 may be considered the ground lift-off time, and length L4 may thus represent the length of tether 402 unwound at the ground lift-off time.

The specific time between T6 and T7, inclusive, selected as the ground lift-off time may depend on, for example, the elasticity and/or stretchability of tether 402. When a non-elastic and/or non-stretchable tether is used, a time closer to time T7 (e.g., T7 itself) may be selected as the ground lift-off time. When a highly elastic and/or highly stretchable tether is used, a time closer to time T6 (e.g., T6 itself) may be selected as the ground lift-off time. In many practical applications, the difference between lengths L3 and L4 may be small and/or insignificant relative to the length L3 and/or L4. Thus, any length between L3 and L4, inclusive, may be usable to determine the tether-based altitude of aerial vehicle 400.

Graphs 420, 430, 520, and 530 include idealized (e.g., low-pass filtered) representations of the tension and unwound tether length as a function of time. It is to be understood that, in practical implementations, graphs 420, 430, 520, and 530 may include representations of noise (e.g., high-frequency variations in tension and/or tether length) resulting from various electromechanical and/or environmental perturbations experienced by aerial vehicle 400 while in operation. Such noise may be filtered out prior to determining the ground contact time, the ground lift-off time, and/or the unwound tether length corresponding to the ground contact time and/or the ground lift-off time.

The tether-based altitude of aerial vehicle 400 may be determined multiple times by repeating the operations shown and described with respect to FIGS. 5A, 5B, and 5C, and averaging the resulting measurements to determine a final tether-based altitude. For example, after payload 408 is lifted up off of ground surface 410, aerial vehicle 400 may lower payload 408 back down to ground surface 410 one or more times and lift payload 408 off of the ground surface 410 one or more times. Thus, one or more additional ground lift-off times and one or more corresponding unwound tether lengths may be determined and used to generate one or more corresponding tether-based altitude measurements. In some cases, a tether-based altitude may be determined both based on lift-off and touch-down of payload 408. Accordingly, in some cases, the tether-based altitude may be determined as part of (e.g., incidentally to) a payload pick-up operation, while in other cases the tether-based altitude may be determined as part of dedicated tether-based altitude measurement operations.

VII. Example Tether-Based Altitude Determination in the Presence of Wind

Figure 6B:
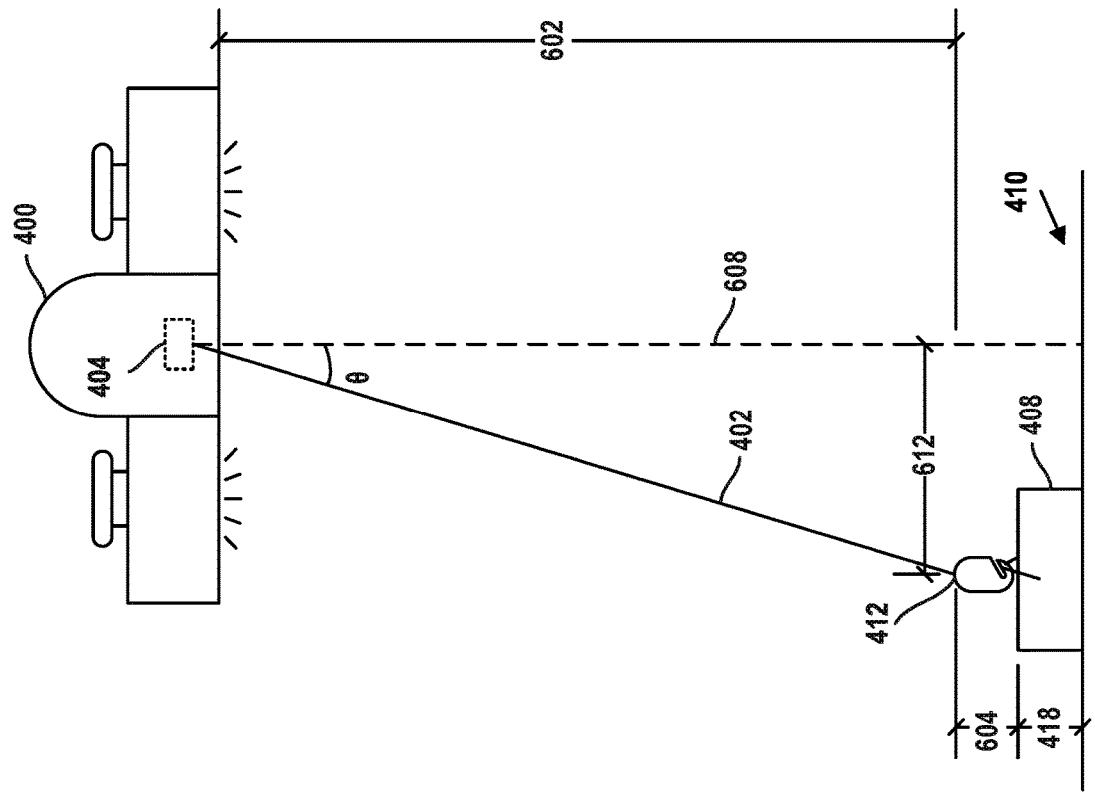
FIGS. 6A, 6B, and 6C illustrate payload drop-off in windy conditions, in accordance with examples described herein.
Figure 6A:
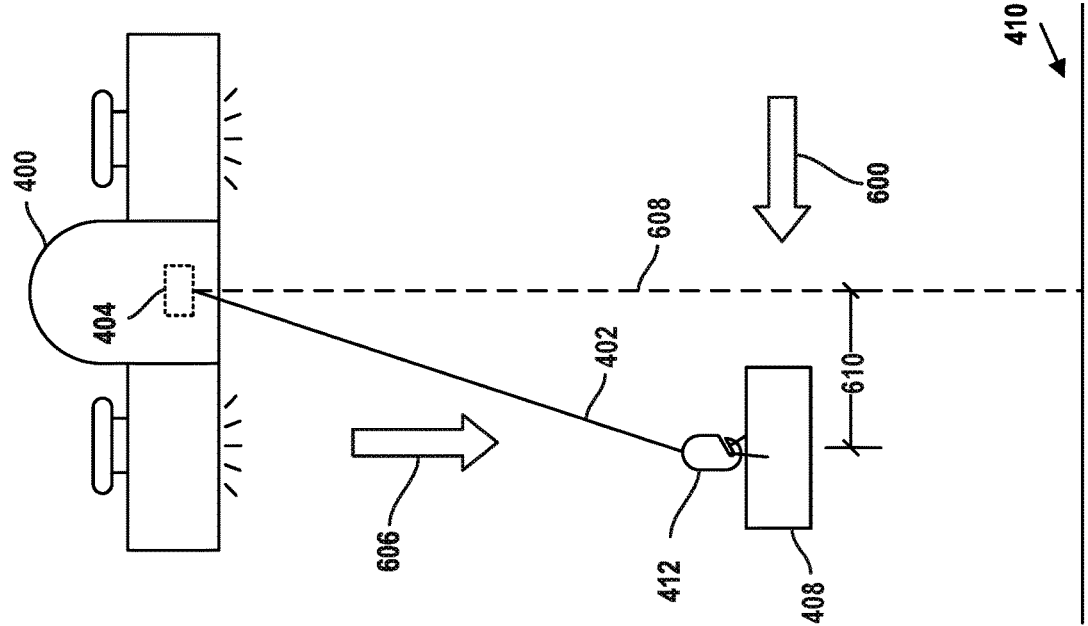

FIGS. 6A and 6B illustrate aspects of an example process for determining an altitude of an aerial vehicle based on a length of tether deployed from the aerial vehicle in the presence of wind. Specifically, FIGS. 6A and 6B show aerial vehicle 400 and the winch system being used to drop-off payload 408, as indicated by arrow 606, while payload 408 is being blown to the left by wind 600.

Wind speed and/or direction of wind 600 may be determined based on and/or using a pitot tube, an anemometer, GPS, measured air velocity of aerial vehicle 400, and/or measured ground velocity of aerial vehicle 400, among other possibilities. For example, aerial vehicle 400 may be equipped with one or more pitot tubes, and/or one or more anemometers, each of which may be configured to generate sensor data indicative of a wind speed along one or more directions. In another example, the speed and/or direction of wind 600 may be determined by comparing an air velocity of aerial vehicle 400 to a ground velocity of aerial vehicle 400. The air velocity of aerial vehicle 400 (i.e., how quickly, and in what direction, aerial vehicle 400 is moving relative to the air) may be determined based on, for example, an amount of propulsion exerted by rotors of aerial vehicle 400 and/or air speed sensors on aerial vehicle 400. Visual odometry and/or GPS data may be used to determine a ground velocity of aerial vehicle 400 (i.e., how quickly, and in what direction, aerial vehicle 400 is moving relative to the ground). The air velocity may be compared to the ground velocity to determine a wind velocity present in the environment of aerial vehicle 400. For example, when a forward ground speed exceeds a forward air speed (i.e., aerial vehicle 400 is flying with a tail wind), a magnitude of the difference may indicate a wind speed in the forward direction. When a sideways ground speed exceeds a sideways air speed (i.e., aerial vehicle 400 is facing a cross wind), a magnitude of the difference may indicate a wind speed in the sideways direction.

In some implementations, the wind speed and/or direction may be determined by a model based on a plurality of different wind measurements obtained from a plurality of different sources. For example, the model may be configured to generate a final wind speed and/or direction measurement based on a combination of (i) sensor data generated by one or more wind sensors (e.g., pitot tubes) on aerial vehicle 400 and (ii) an estimate of the speed and/or direction of wind 600 determined based on comparing the air velocity of aerial vehicle 400 to the ground velocity of aerial vehicle 400. The combination may be implemented using, for example, a weighted average, a Kalman filter, and/or a machine learning model, among other possibilities The measured wind speed and/or direction of wind 600 may be used to determine a position of tether 402, payload coupling apparatus 412, and/or payload 408 relative to aerial vehicle 400. Specifically, due to tether 402 being flexible, the tethered component may be displaced by wind 600 laterally relative to aerial vehicle 400. Further, while a given length of tether 402 is deployed, the lateral displacement of the tethered component may also be associated with a vertical displacement of the tethered component due to the given tether length now having a horizontal component and a vertical component.

As shown in FIG. 6A, while spool 404 is operated to lower payload coupling apparatus 412 and/or payload 408 to ground surface 410, wind 600 may cause payload 408, payload coupling apparatus 412, and parts of tether 402 to be displaced horizontally in the direction of wind 600. Specifically, wind 600 may displace payload 408 and/or payload coupling apparatus 412 horizontally by distance 610 relative to reference line 608, which indicates where tether 402 would be positioned in the absence of any wind. When payload 408 makes contact with ground surface 410, as indicated in FIG. 6B, the horizontal displacement of payload 408 and/or payload coupling apparatus 412 relative to reference line 608 may increase to distance 612. FIG. 6B illustrates distance 612 being measured between reference line 608 and a top of payload coupling apparatus 412, and distance 602 being measured between aerial vehicle 400 and the top of payload coupling apparatus 412. In other implementations, distances 602 and 612 may be measured relative to a centroid of payload 408, a centroid of payload coupling apparatus 412, and/or another reference point on payload 408 and/or payload coupling apparatus 412.

The wind-induced displacement of payload 408 and/or payload coupling apparatus 412 may be accounted for when using the unwound length of tether 402 to determine the tether-based altitude of aerial vehicle 400. As discussed with respect to FIGS. 4A and 4B, sensor data may be used to determine a ground contact time at which payload coupling apparatus 412 and/or payload 408 makes initial contact with ground surface 410, as illustrated in FIG. 6B. At the ground contact time, tether 402 may be modeled by a hypotenuse of a right triangle, distance 602 may be modeled by a first leg of the right triangle, and distance 612 may be modeled by a second leg of the right triangle. Accordingly, a vertical component of the length of tether 402 deployed from aerial vehicle 400 at the ground contact time may be indicative of distance 602.

Distance 602 may be determined by determining the angle $\theta$ between reference line 608 and tether 402. Specifically, payload 408, payload coupling apparatus 412, and/or tether 402 may be modeled as having a downward weight of $F_W=Mg$, where M represents the effective mass of payload 408, payload coupling apparatus 412, and/or the deployed part of tether 402, and g represents the acceleration due to gravity. Additionally, payload 408, payload coupling apparatus 412, and/or tether 402 may be modeled as experiencing a horizontal drag force of $F_D=\frac{1}{2}\rho v^2 C_D A$, where $\rho$ represents a density of air, v represents a velocity of wind 600, $C_D$ represents a drag coefficient of payload 408, payload coupling apparatus 412, and/or tether 402, and A represents a combined cross-sectional area of payload 408, payload coupling apparatus 412, and/or tether 402 against which wind 600 is blowing (i.e., the cross-sectional area of a surface having a normal parallel to a vector representing wind 600). Thus, $$\tan\theta = \frac{F_D}{F_W} \text{ and } \theta = \tan^{-1}\left(\frac{F_D}{F_W}\right).$$

Distance 602 may thus be represented as d=l sin θ, where d represents distance 602, l represents the length of tether 402 deployed from aerial vehicle 400 at the ground contact time, and $$\theta = \tan^{-1}\left(\frac{F_D}{F_W}\right),$$

as determined above. Thus, when payload 408 is connected to payload coupling apparatus 412, the tether-based altitude of aerial vehicle 400 may be determined based on a sum of (i) distance 602, (ii) height 604 of payload coupling apparatus 412, and (iii) height 418 of payload 408. When payload coupling apparatus 412 is empty, the tether-based altitude of aerial vehicle 400 may be determined based on a sum of (i) distance 602 and (ii) height 604. In implementations where payload coupling apparatus 412 is rigidly connected to payload 408, and the orientation of payload coupling apparatus 412 is thus not affected by wind 600, height 604 may be equal to height 416. In implementations where the orientation of payload coupling apparatus 412 is dependent on wind 600, height 604 may represent a vertical component of height 416.

In some cases, the shape of tether 402 may differ from that shown in FIGS. 6A and 6B when wind 600 is present. For example, when payload coupling apparatus 412 and payload 408 are significantly heavier and/or experience significantly more drag than the deployed length of tether 402, the model described above may be sufficiently accurate to be used in determining the tether-based altitude, since tether 402 may have an approximately linear shape in response to wind 600. For example, when 5% or less of the total drag force is accounted for by tether 402, the triangular approximation of FIGS. 6A and 6B may be sufficiently accurate for practical applications. When tether 402 becomes a more significant contributor of mass and/or drag (e.g., when payload coupling apparatus 412 is empty, or when payload 408 is relatively light-weight), and/or when a more accurate tether-based altitude determination is desired, the horizontal displacement of tether 402, payload coupling apparatus 412, and/or payload 408 may be modeled in other ways.

Figure 6C:
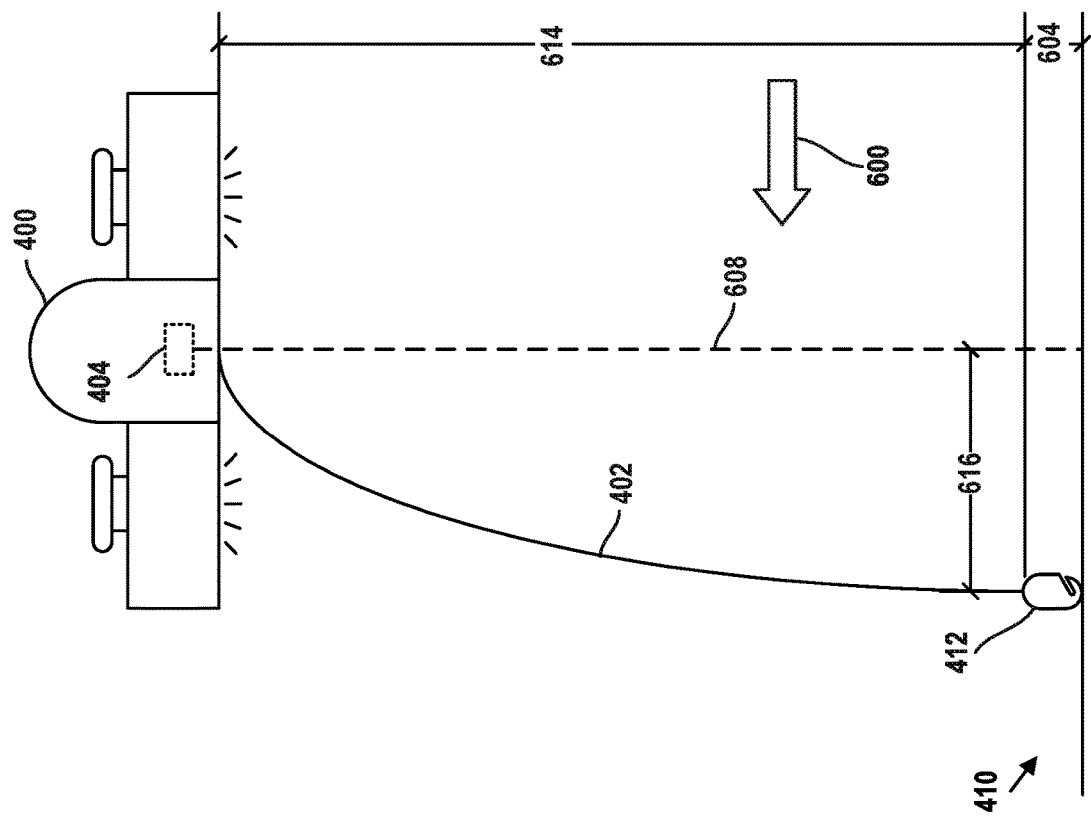

FIG. 6C illustrates tether 402 taking on a parabolic shape when wind 600 is present in the environment. Specifically, tether 402 may be modeled by a parabolic shape when the mass and/or drag of tether 402 is non-negligible relative to a mass and/or drag of payload coupling apparatus 412 and/or payload 408. The wind-induced displacement of payload coupling apparatus 412 relative to aerial vehicle 400 may be determined using a quadratic model of tether 402 and payload coupling apparatus 412 (and, in some cases, payload 408), which may be expressed as $O_x = k_x^l v_{WIND}^2$ and $O_z = k_z^l v_{WIND}^2$, where O represents the position of payload coupling apparatus 412 relative to aerial vehicle 400, $k^l$ represents a model-based constant corresponding to deployed length l of tether 402, v represents the wind speed, x denotes the lateral direction component (i.e., forward, backward, leftward, or rightward), and z denotes the vertical direction component (i.e., up or down). Thus, the wind-induced displacements of payload coupling apparatus 412 relative to aerial vehicle 400 may be modeled as a product of a model-based constant $k^l$ and a quadratic wind velocity term.

The value of the model-based constant $k^l$ may be determined using a physics-based model of tether 402, payload coupling apparatus 412, and/or payload 408. For example, payload coupling apparatus 412 and payload 408 may each be modeled as a point mass with a corresponding drag coefficient and cross-section facing the wind. Similarly, tether 402 may be assumed to be perfectly flexible and have a uniform mass per unit length, and may be modeled as a series of point masses, each of which has a corresponding drag coefficient, and cross-section facing the wind. For each point mass, an angle of the point mass relative to aerial vehicle 400 may be individually determined based on the mass thereof, the distance thereof relative to aerial vehicle 400, the drag coefficient thereof, and the cross-section thereof. A total deflection profile of the entirety of tether 402, payload coupling apparatus 412, and/or payload 408 may be determined, for a given deployed tether length l, by taking an integral of the angle of each point mass along the length l of tether 402.

For each respective deployed tether length l, a plurality of different deflection profiles of tether 402 corresponding to a plurality of different wind speeds may be determined. For example, deflection profiles corresponding to wind speeds ranging from 0 knots to 30 knots may be determined in 1 knot increments. The profile of tether 402 shown in FIG. 6C may represent one of the plurality of profiles, and may correspond to a wind speed of wind 600 and a particular deployed tether length.

The value of the model-based constant $k^l$ may be determined by fitting the quadratic model to represent the position of payload coupling apparatus 412 and/or payload 408 (e.g., a bottom part of the tethered component expected to contact ground surface 410) across different wind speeds. Specifically, the lateral offset constant $k_x^l$ may be determined by fitting the function $O_x = k_x^l v_{WIND}^2$ to the lateral displacement of payload coupling apparatus 412, as indicated by the plurality of different deflection profiles. The vertical offset constant $k_z^l$ may be determined by fitting the function $O_z = k_z^l v_{WIND}^2$ to the vertical displacement of payload coupling apparatus 412, as indicated by the plurality of different deflection profiles. Different values of deployed tether length l may be accounted for by repeating these operations for different values of l, resulting in a plurality of each of model-based constants $k_x^l$ and $k_z^l$.

Accordingly, distance 614 may be determined using the function $O_z = k_z^l v_{WIND}^2$, by selecting a value of model-based constants $k_z^l$ that corresponds to the length l of tether 402 deployed from aerial vehicle 400 at the ground contact time and based on a square of a speed of wind 600. Distance 616 may be determined using the function $O_x = k_x^l v_{WIND}^2$, by selecting a value of model-based constants $k_x^l$ that corresponds to the length l of tether 402 deployed from aerial vehicle 400 at the ground contact time and based on a square of a speed of wind 600. In some implementations, $O_x$ and $O_z$ may each be expressed as functions of deployed tether length l.

In some implementations, distance 610, 612, and/or 616 may be determined based on image data generated by a camera on aerial vehicle 400 and representing payload coupling apparatus 412 and/or payload 408 beneath aerial vehicle 400. Distances 602 and 614 may be determined, respectively, based on measured distances 612 and 616, using the trigonometric and/or parabolic models discussed above. Such a determination of distances 602 and 614 may be performed in addition or as an alternative to the wind-based determination of distances 602 and 614. For example, a first value for distance 602, as determined using the wind model, may be averaged with a second value for distance 602, as determined based on the image data.

VIII. Additional Example Operations

Figure 7:
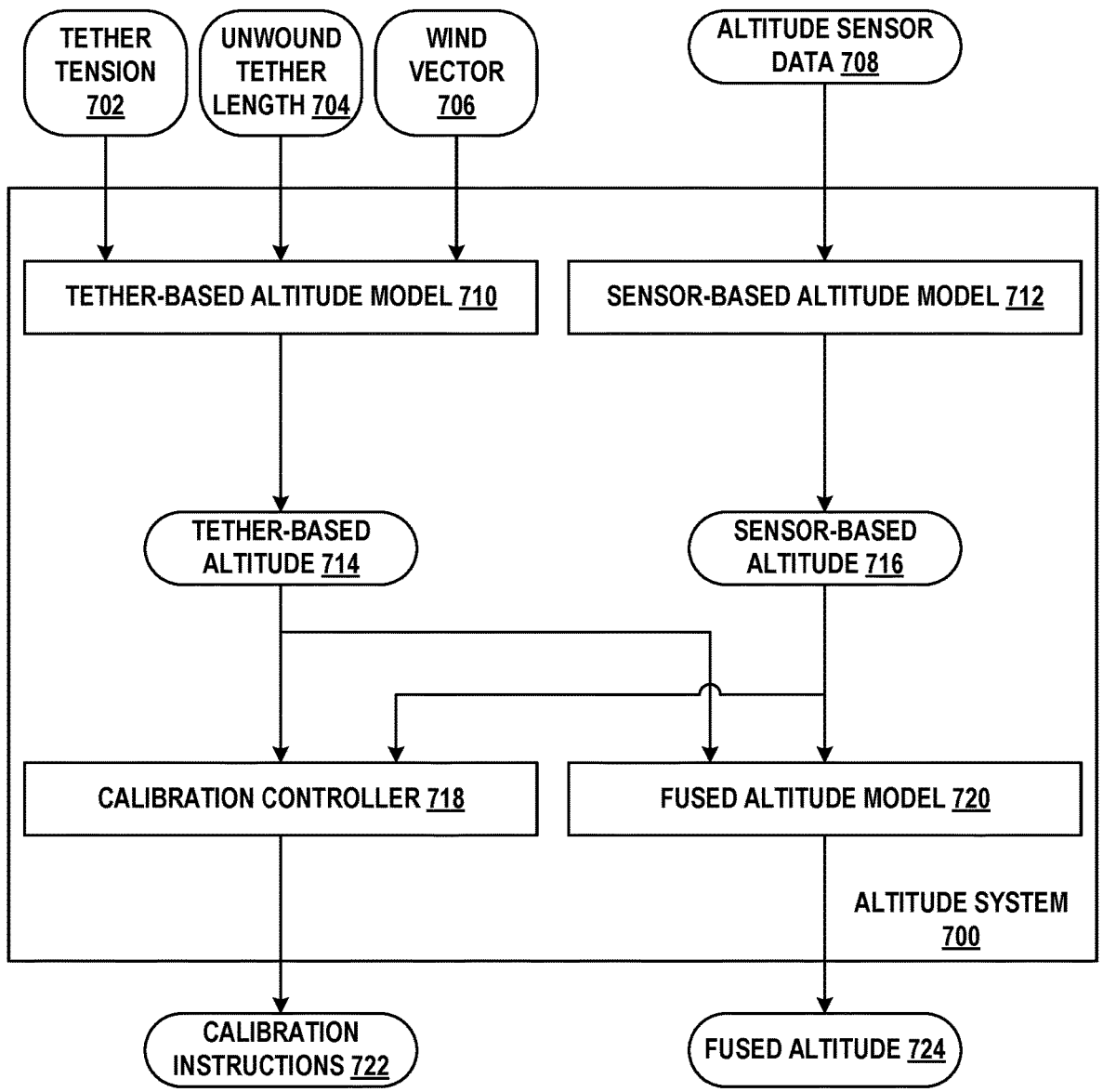
FIG. 7 is a block diagram of an altitude system, in accordance with examples described herein.

FIG. 7 illustrates an example system that may be used to carry out the operations discussed herein. Specifically, altitude system 700 may include tether-based altitude model 710, sensor-based altitude model 712, calibration controller 718, and fused altitude model 720. Altitude system 700 may be configured to generate calibration instructions 722 and/or fused altitude 724 based on tether tension 702, unwound tether length 704, wind vector 706, and/or altitude sensor data 708.

Tether-based altitude model 710 may be configured to generate tether-based altitude 714 based on tether tension 702 and unwound tether length 704 (e.g., as shown in and discussed with respect to FIGS. 4A, 4B, 4C, 5A, 5B, and 5C). In some implementations, tether-based altitude model 710 may be configured to generate tether-based altitude 714 based additionally on wind vector 706 (e.g., as shown in and discussed with respect to FIGS. 6A, 6B, and/or 6C).

Tether tension 702 may represent a tension experienced by a tether deployed by an aerial vehicle while the tether is being lowered to a ground surface and/or picked up from the ground surface. When the tether is being lowered to the ground surface, tether-based altitude model 710 may be configured to identify a ground contact time based on tether tension 702. When the tether is being picked up from the ground surface, tether-based altitude model 710 may be configured to identify a ground lift-off time based on tether tension 702.

Tether-based altitude model 710 may be configured to determine tether-based altitude 714 based on a value of unwound tether length 704 corresponding to the ground contact time and/or the ground lift-off time. Specifically, when wind vector 706 is negligible and/or relatively small (e.g., under a threshold magnitude) and/or when wind is not being accounted for, tether-based altitude 714 may be equal to the value of unwound tether length 704 corresponding to the ground contact time and/or the ground lift-off time. When wind vector 706 is being accounted for, tether-based altitude 714 may be equal to a vertical component of the value of unwound tether length 704 corresponding to the ground contact time and/or the ground lift-off time. The vertical component of the value of unwound tether length 704 may be determined based on a triangular and/or parabolic model of the tether, as shown in and discussed with respect to FIGS. 6A, 6B, and 6C.

Sensor-based altitude model 712 may be configured to determine sensor-based altitude 716 based on altitude sensor data 708. Altitude sensor data 708 may include barometric pressure data generated by a barometric pressure sensor, stereoscopic image data generated by a stereoscopic camera, RADAR data generated by a RADAR device, and/or LIDAR data generated by a LIDAR device, among other possibilities. Accordingly, sensor-based altitude 716 may represent a non-tether-based altitude of the aerial vehicle, as measured using one or more sensors provided on the aerial vehicle. In some cases, sensor-based altitude 716 may include a plurality of different sensor-based altitude measurements determined based on a plurality of different sources of altitude sensor data 708. For example, sensor-based altitude 716 may include a barometer-based altitude, a camera-based altitude, a RADAR-based altitude, and/or a LIDAR-based altitude, among others.

Accordingly, sensor-based altitude 716 may provide an alternative altitude measurement, which may have different noise properties than tether-based altitude 714. Tether-based altitude 714 may be used in combination with sensor-based altitude 716 to generate a more accurate altitude measurement and/or identify errors in the altitude sensor data 708.

Specifically, calibration controller 718 may be configured to generate calibration instructions 722 based on tether-based altitude 714 and sensor-based altitude 716. For example, calibration controller 718 may be configured to determine a difference between tether-based altitude 714 and sensor-based altitude 716. When the difference exceeds a threshold difference, calibration controller 718 may generate calibration instructions 722 indicating that the sensor used in determining sensor-based altitude 716 is to be recalibrated, validated, and/or replaced. Thus, tether-based altitude 714 may be used to determine whether other altitude sensors of the aerial vehicle are operating correctly. When incorrect operation of the other altitude sensors is detected by calibration controller 718, calibration instructions 722 may indicate operations to be performed by the aerial vehicle to correct the operation of the other altitude sensors.

In one example, calibration instructions 722 may instruct the aerial vehicle to travel to a particular location that includes a calibration target or other calibration apparatus, and perform a calibration of one or more altitude sensors. In another example, calibration instructions 722 may instruct the aerial vehicle to travel to a location at which manual inspection and/or adjustment of the one or more altitude sensor can be performed.

Fused altitude model 720 may be configured to generate fused altitude 724 based on tether-based altitude 714 and sensor-based altitude 716. Fused altitude 724 may represent a measurement of the altitude of the aerial vehicle that is based on information from both tether-based altitude 714 and sensor-based altitude 716. For example, fused altitude model 720 may include a weighted sum, a Kalman filter, a machine learning model, and/or other functions configured to combine multiple altitude measurements. Fused altitude 724 may be more accurate than either tether-based altitude 714 or sensor-based altitude 716 considered individually.

In some embodiments, the operations of calibration controller 718 and/or fused altitude model 720 may be performed after the aerial vehicle has completed one or more tasks. For example, calibration instructions 722 and/or fused altitude 724 may be generated based on input data collected by the aerial vehicle over the course of a plurality of tasks. Thus, for example, performance of sensors that generate altitude sensor data 708 may be quantified based on data spanning a period of time corresponding to the plurality of tasks. Calibration instructions 722 and/or fused altitude 724 may be utilized prior to initiating one or more subsequent tasks.

IX. Additional Example Operations

Figure 8:
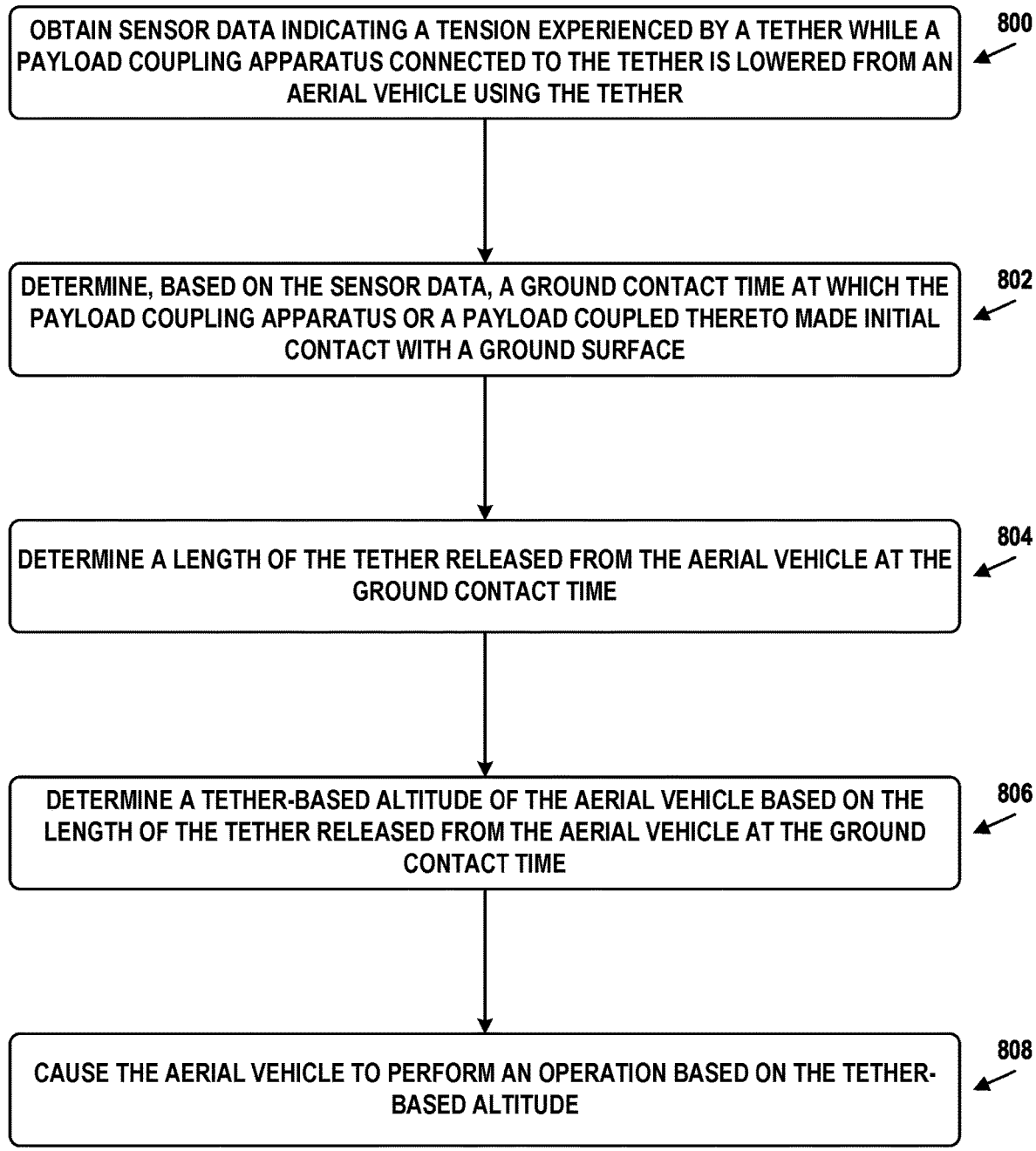
FIG. 8 is a flow chart, in accordance with examples described herein.

FIG. 8 illustrates a flow chart of operations related to determining an altitude of an aerial vehicle based on a length of tether deployed from the aerial vehicle. The operations may be carried out by UAV 100, UAV 120, UAV 140, UAV 160, UAV 180, UAV 200, distributed UAV system 300, aerial vehicle 400, and/or altitude system 700, among other possibilities. The embodiments of FIG. 8 may be simplified by the removal of any one or more of the features shown therein. Further, these embodiments may be combined with features, aspects, and/or implementations of any of the previous figures or otherwise described herein.

Block 800 may include obtaining sensor data indicating a tension experienced by a tether while a payload coupling apparatus connected to the tether is lowered from an aerial vehicle using the tether.

Block 802 may include determining, based on the sensor data, a ground contact time at which the payload coupling apparatus or a payload coupled thereto made initial contact with a ground surface.

Block 804 may include determining a length of the tether released from the aerial vehicle at the ground contact time.

Block 806 may include determining a tether-based altitude of the aerial vehicle based on the length of the tether released from the aerial vehicle at the ground contact time.

Block 808 may include causing the aerial vehicle to perform an operation based on the tether-based altitude.

In some embodiments, the aerial vehicle may include a winch system that includes the tether disposed on a spool and a motor operable to apply a force to the tether by applying a torque to the spool.

In some embodiments, the sensor data may be generated by a motor current sensor and may represent the torque applied by the motor to the spool.

In some embodiments, determining the length of the tether released from the aerial vehicle at the ground contact time may include determining a number of revolutions of the spool between (i) initiation of lowering of the payload coupling apparatus from the aerial vehicle and (ii) the ground contact time. Determining the length of the tether released from the aerial vehicle at the ground contact time may also include determining the length of the tether released from the aerial vehicle at the ground contact time based on the number of revolutions of the spool.

In some embodiments, the sensor data may be generated by a force sensor connected in-line with the tether.

In some embodiments, additional sensor data may be obtained, where the additional sensor data is indicative of (i) a speed of the payload coupling apparatus while the payload coupling apparatus is being lowered from the aerial vehicle and (ii) a change in the speed due to the payload coupling apparatus or the payload coupled thereto making the initial contact with the ground surface. The ground contact time may be determined further based on the additional sensor data.

In some embodiments, determining the ground contact time may include determining, based on the sensor data, that the tension experienced by the tether dropped below a threshold tension associated with a mass of the payload coupling apparatus and any payload coupled thereto. Determining the ground contact time may also include, based on determining that the tension experienced by the tether dropped below the threshold tension, determining the ground contact time.

In some embodiments, determining the tether-based altitude of the aerial vehicle may include determining a vertical dimension of one or more of: (i) the payload coupling apparatus or (ii) the payload coupled to the payload coupling apparatus, when lowered from the aerial vehicle using the tether. Determining the tether-based altitude of the aerial vehicle may also include determining the tether-based altitude based on a sum of (i) the length of the tether released from the aerial vehicle at the ground contact time and (ii) the vertical dimension.

In some embodiments, determining the tether-based altitude of the aerial vehicle may include determining a wind vector representing a wind condition present while the payload coupling apparatus is being lowered from the aerial vehicle. Determining the tether-based altitude of the aerial vehicle may also include determining a horizontal displacement of the payload coupling apparatus due to the wind vector. The tether-based altitude of the aerial vehicle may be determined by determining a vertical component of the length of the tether released from the aerial vehicle at the ground contact time based on (i) the length of the tether released from the aerial vehicle at the ground contact time and (ii) the horizontal displacement of the payload coupling apparatus due to the wind vector.

In some embodiments, causing the aerial vehicle to perform the operation based on the tether-based altitude may include determining an altitude difference between (i) the tether-based altitude of the aerial vehicle and (ii) a sensor-based altitude of the aerial vehicle determined by an altitude sensor provided on the aerial vehicle. The aerial vehicle may be caused to perform the operation based on the altitude difference.

In some embodiments, causing the aerial vehicle to perform the operation based on the altitude difference may include determining that the altitude difference exceeds a threshold altitude difference and, based on determining that the altitude difference exceeds the threshold altitude difference, causing the aerial vehicle to perform a calibration of the altitude sensor.

In some embodiments, causing the aerial vehicle to perform the operation based on the tether-based altitude may include determining a fused altitude based on a combination of (i) the tether-based altitude of the aerial vehicle and (ii) a sensor-based altitude of the aerial vehicle determined by an altitude sensor provided on the aerial vehicle. The aerial vehicle may be caused to perform the operation based on the fused altitude.

In some embodiments, determining the fused altitude may include determining the fused altitude using a machine learning model based on (i) the tether-based altitude and (ii) the sensor-based altitude.

In some embodiments, the aerial vehicle may be caused to retract the tether to pick up the payload coupling apparatus or the payload coupled thereto from the ground surface. After picking up the payload coupling apparatus or the payload coupled thereto from the ground surface, additional sensor data may be obtained. The additional sensor data may indicate an additional tension experienced by the tether while the payload coupling apparatus or the payload coupled thereto is lowered back toward the ground surface. Based on the additional sensor data, a second ground contact time at which the payload coupling apparatus or the payload coupled thereto made additional contact with the ground surface after being picked up from the ground surface may be determined. A second length of the tether released from the aerial vehicle at the second ground contact time may be determined. A second tether-based altitude of the aerial vehicle may be determined based on the second length of the tether released from the aerial vehicle at the second ground contact time. The aerial vehicle may be caused to perform the operation further based on the second tether-based altitude.

In some embodiments, additional sensor data may be obtained. The additional sensor data may indicate an additional tension experienced by the tether while the payload coupling apparatus is being picked up from the ground surface using the tether. A ground liftoff time at which the payload coupling apparatus or the payload coupled thereto were lifted off of the ground surface may be determined based on the additional sensor data. A second length of the tether released from the aerial vehicle at the ground liftoff time may be determined. A second tether-based altitude of the aerial vehicle may be determined based on the second length of the tether released from the aerial vehicle at the ground liftoff time. The aerial vehicle may be caused to perform the operation further based on the second tether-based altitude.

In some embodiments, the sensor data may be obtained while the aerial vehicle is dropping off the payload at a delivery location.

X. Conclusion

The present disclosure is not to be limited in terms of the particular embodiments described in this application, which are intended as illustrations of various aspects. Many modifications and variations can be made without departing from its scope, as will be apparent to those skilled in the art. Functionally equivalent methods and apparatuses within the scope of the disclosure, in addition to those described herein, will be apparent to those skilled in the art from the foregoing descriptions. Such modifications and variations are intended to fall within the scope of the appended claims.

The above detailed description describes various features and operations of the disclosed systems, devices, and methods with reference to the accompanying figures. In the figures, similar symbols typically identify similar components, unless context dictates otherwise. The example embodiments described herein and in the figures are not meant to be limiting. Other embodiments can be utilized, and other changes can be made, without departing from the scope of the subject matter presented herein. It will be readily understood that the aspects of the present disclosure, as generally described herein, and illustrated in the figures, can be arranged, substituted, combined, separated, and designed in a wide variety of different configurations.

With respect to any or all of the message flow diagrams, scenarios, and flow charts in the figures and as discussed herein, each step, block, and/or communication can represent a processing of information and/or a transmission of information in accordance with example embodiments. Alternative embodiments are included within the scope of these example embodiments. In these alternative embodiments, for example, operations described as steps, blocks, transmissions, communications, requests, responses, and/or messages can be executed out of order from that shown or discussed, including substantially concurrently or in reverse order, depending on the functionality involved. Further, more or fewer blocks and/or operations can be used with any of the message flow diagrams, scenarios, and flow charts discussed herein, and these message flow diagrams, scenarios, and flow charts can be combined with one another, in part or in whole.

A step or block that represents a processing of information may correspond to circuitry that can be configured to perform the specific logical functions of a herein-described method or technique. Alternatively or additionally, a block that represents a processing of information may correspond to a module, a segment, or a portion of program code (including related data). The program code may include one or more instructions executable by a processor for implementing specific logical operations or actions in the method or technique. The program code and/or related data may be stored on any type of computer readable medium such as a storage device including random access memory (RAM), a disk drive, a solid state drive, or another storage medium.

The computer readable medium may also include non-transitory computer readable media such as computer readable media that store data for short periods of time like register memory, processor cache, and RAM. The computer readable media may also include non-transitory computer readable media that store program code and/or data for longer periods of time. Thus, the computer readable media may include secondary or persistent long term storage, like read only memory (ROM), optical or magnetic disks, solid state drives, compact-disc read only memory (CD-ROM), for example. The computer readable media may also be any other volatile or non-volatile storage systems. A computer readable medium may be considered a computer readable storage medium, for example, or a tangible storage device.

Moreover, a step or block that represents one or more information transmissions may correspond to information transmissions between software and/or hardware modules in the same physical device. However, other information transmissions may be between software modules and/or hardware modules in different physical devices.

The particular arrangements shown in the figures should not be viewed as limiting. It should be understood that other embodiments can include more or less of each element shown in a given figure. Further, some of the illustrated elements can be combined or omitted. Yet further, an example embodiment can include elements that are not illustrated in the figures.

While various aspects and embodiments have been disclosed herein, other aspects and embodiments will be apparent to those skilled in the art. The various aspects and embodiments disclosed herein are for purpose of illustration and are not intended to be limiting, with the true scope being indicated by the following claims.

What is claimed is:

1. A computer-implemented method comprising:
   obtaining sensor data indicating a tension experienced by a tether while a payload coupling apparatus connected to the tether is lowered from an aerial vehicle using the tether;
   determining, based on the sensor data, a ground contact time at which the payload coupling apparatus or a payload coupled thereto made initial contact with a ground surface;
   determining a length of the tether released from the aerial vehicle at the ground contact time;
   determining a wind vector representing a wind condition present while the payload coupling apparatus is being lowered from the aerial vehicle;
   determining, based on the length of the tether released from the aerial vehicle at the ground contact time and using a tether model corresponding to a shape of the tether caused by the wind vector, a tether-based altitude of the aerial vehicle by determining a vertical component of the length of the tether released from the aerial vehicle at the ground contact time; and
   causing the aerial vehicle to perform an operation based on the tether-based altitude.

2. The computer-implemented method of claim 1, wherein the aerial vehicle comprises a winch system comprising the tether disposed on a spool and a motor operable to apply a force to the tether by applying a torque to the spool.

3. The computer-implemented method of claim 2, wherein the sensor data is generated by a motor current sensor and represents the torque applied by the motor to the spool.

4. The computer-implemented method of claim 2, wherein determining the length of the tether released from the aerial vehicle at the ground contact time comprises:
    determining a number of revolutions of the spool between (i) initiation of lowering of the payload coupling apparatus from the aerial vehicle and (ii) the ground contact time; and
    determining the length of the tether released from the aerial vehicle at the ground contact time based on the number of revolutions of the spool.

5. The computer-implemented method of claim 1, wherein the sensor data is generated by a force sensor connected in-line with the tether.

6. The computer-implemented method of claim 1, further comprising:
    obtaining additional sensor data indicative of (i) a speed of the payload coupling apparatus while the payload coupling apparatus is being lowered from the aerial vehicle and (ii) a change in the speed due to the payload coupling apparatus or the payload coupled thereto making the initial contact with the ground surface, wherein the ground contact time is determined further based on the additional sensor data.

7. The computer-implemented method of claim 1, wherein determining the ground contact time comprises:
    determining, based on the sensor data, that the tension experienced by the tether dropped below a threshold tension associated with a mass of the payload coupling apparatus and any payload coupled thereto; and
    based on determining that the tension experienced by the tether dropped below the threshold tension, determining the ground contact time.

8. The computer-implemented method of claim 1, wherein determining the tether-based altitude of the aerial vehicle comprises:
    determining a vertical dimension of one or more of: (i) the payload coupling apparatus or (ii) the payload coupled to the payload coupling apparatus, when lowered from the aerial vehicle using the tether; and
    determining the tether-based altitude based on a sum of (i) the vertical component of the length of the tether released from the aerial vehicle at the ground contact time and (ii) the vertical dimension.

9. The computer-implemented method of claim 1, wherein determining the tether-based altitude of the aerial vehicle comprises:
    determining, based on one or more physical properties of the tether, the payload coupling apparatus, or the payload, that the shape of the tether comprises a linear shape, wherein, when the shape of the tether comprises a linear shape, the tether model represents the tether and the payload coupling apparatus as a hypotenuse of a right triangle;
    based on determining that the shape of the tether comprises a linear shape, determining a horizontal displacement of the payload coupling apparatus due to the wind vector; and
    determining, using the tether model, the vertical component of the length of the tether based on (i) the length of the tether released from the aerial vehicle at the ground contact time and (ii) the horizontal displacement of the payload coupling apparatus due to the wind vector.

10. The computer-implemented method of claim 1, wherein causing the aerial vehicle to perform the operation based on the tether-based altitude comprises:
    determining an altitude difference between (i) the tether-based altitude of the aerial vehicle and (ii) a sensor-based altitude of the aerial vehicle determined by an altitude sensor provided on the aerial vehicle; and
    causing the aerial vehicle to perform the operation based on the altitude difference.

11. The computer-implemented method of claim 10, wherein causing the aerial vehicle to perform the operation based on the altitude difference comprises:
    determining that the altitude difference exceeds a threshold altitude difference; and
    based on determining that the altitude difference exceeds the threshold altitude difference, causing the aerial vehicle to perform a calibration of the altitude sensor.

12. The computer-implemented method of claim 1, wherein causing the aerial vehicle to perform the operation based on the tether-based altitude comprises:
    determining a fused altitude based on a combination of (i) the tether-based altitude of the aerial vehicle and (ii) a sensor-based altitude of the aerial vehicle determined by an altitude sensor provided on the aerial vehicle; and
    causing the aerial vehicle to perform the operation based on the fused altitude.

13. The computer-implemented method of claim 12, wherein determining the fused altitude comprises:
    determining the fused altitude using a machine learning model based on (i) the tether-based altitude and (ii) the sensor-based altitude.

14. The computer-implemented method of claim 1, further comprising:
    causing the aerial vehicle to retract the tether to pick up the payload coupling apparatus or the payload coupled thereto from the ground surface;
    after picking up the payload coupling apparatus or the payload coupled thereto from the ground surface, obtaining additional sensor data indicating an additional tension experienced by the tether while the payload coupling apparatus or the payload coupled thereto is lowered back toward the ground surface;
    determining, based on the additional sensor data, a second ground contact time at which the payload coupling apparatus or the payload coupled thereto made additional contact with the ground surface after being picked up from the ground surface;
    determining a second length of the tether released from the aerial vehicle at the second ground contact time; and
    determining a second tether-based altitude of the aerial vehicle based on the second length of the tether released from the aerial vehicle at the second ground contact time, wherein the aerial vehicle is caused to perform the operation further based on the second tether-based altitude.

15. The computer-implemented method of claim 1, further comprising:
    obtaining additional sensor data indicating an additional tension experienced by the tether while the payload coupling apparatus is being picked up from the ground surface using the tether;
    determining, based on the additional sensor data, a ground liftoff time at which the payload coupling apparatus or the payload coupled thereto was lifted off of the ground surface;

determining a second length of the tether released from the aerial vehicle at the ground liftoff time; and determining a second tether-based altitude of the aerial vehicle based on the second length of the tether released from the aerial vehicle at the ground liftoff time, wherein the aerial vehicle is caused to perform the operation further based on the second tether-based altitude.

16. The computer-implemented method of claim 1, wherein the sensor data is obtained while the aerial vehicle is dropping off the payload at a delivery location.

17. A system comprising:
   a processor; and
   a non-transitory computer-readable medium having stored thereon instructions that, when executed by the processor, cause the processor to perform functions comprising:
      obtaining sensor data indicating a tension experienced by a tether while a payload coupling apparatus connected to the tether is lowered from an aerial vehicle using the tether;
      determining, based on the sensor data, a ground contact time at which the payload coupling apparatus or a payload coupled thereto made initial contact with a ground surface;
      determining a length of the tether released from the aerial vehicle at the ground contact time;
      determining a wind vector representing a wind condition present while the payload coupling apparatus is being lowered from the aerial vehicle;
      determining, based on the length of the tether released from the aerial vehicle at the ground contact time and using a tether model corresponding to a shape of the tether caused by the wind vector, a tether-based altitude of the aerial vehicle by determining a vertical component of the length of the tether released from the aerial vehicle at the ground contact time; and
      causing the aerial vehicle to operate based on the tether-based altitude.

18. The system of claim 17, wherein causing the aerial vehicle to operate based on the tether-based altitude comprises:
   determining a fused altitude based on a combination of (i) the tether-based altitude of the aerial vehicle and (ii) a sensor-based altitude of the aerial vehicle determined by an altitude sensor provided on the aerial vehicle; and
   causing the aerial vehicle to operate based on the fused altitude.

19. A non-transitory computer-readable medium having stored thereon instructions that, when executed by a computing system, cause the computing system to perform operations comprising:
   obtaining sensor data indicating a tension experienced by a tether while a payload coupling apparatus connected to the tether is lowered from an aerial vehicle using the tether;
   determining, based on the sensor data, a ground contact time at which the payload coupling apparatus or a payload coupled thereto made initial contact with a ground surface;
   determining a length of the tether released from the aerial vehicle at the ground contact time;
   determining a wind vector representing a wind condition present while the payload coupling apparatus is being lowered from the aerial vehicle;
   determining, based on the length of the tether released from the aerial vehicle at the ground contact time and using a tether model corresponding to a shape of the tether caused by the wind vector, a tether-based altitude of the aerial vehicle by determining a vertical component of the length of the tether released from the aerial vehicle at the ground contact time; and
   causing the aerial vehicle to operate based on the tether-based altitude.

20. The computer-implemented method of claim 1, wherein determining the vertical component of the length of the tether comprises:
   determining, based on one or more physical properties of the tether, the payload coupling apparatus, or the payload, that the shape of the tether comprises a parabolic shape, wherein, when the shape of the tether comprises a parabolic shape, the tether model represents the tether and the payload coupling apparatus as a section of a parabola; and
   based on determining that the shape of the tether comprises a parabolic shape, determining, using the tether model, a vertical position of the payload coupling apparatus based on a product of (i) a model-based constant corresponding to the length of the tether released from the aerial vehicle and (ii) a wind velocity associated with the wind condition.

* * * * *